United States Patent
Ishimoto

(10) Patent No.: US 8,164,774 B2
(45) Date of Patent: Apr. 24, 2012

(54) OUTPUT SYSTEM AND DEVICE FOR INFORMATION REPRODUCTION

(75) Inventor: Kan Ishimoto, Aichi (JP)

(73) Assignee: Brother Kogyo Kabushiki Kaisha, Nagoya-shi (JP)

(*) Notice: Subject to any disclaimer, the term of this patent is extended or adjusted under 35 U.S.C. 154(b) by 1271 days.

(21) Appl. No.: 11/755,963

(22) Filed: May 31, 2007

(65) Prior Publication Data

US 2007/0280470 A1  Dec. 6, 2007

(30) Foreign Application Priority Data

May 31, 2006  (JP) ................... 2006-152299
Sep. 25, 2006  (JP) ................... 2006-259118

(51) Int. Cl.
*G06F 3/12* (2006.01)
(52) U.S. Cl. ........ 358/1.15; 358/1.1; 358/1.9; 358/1.14; 379/373.02
(58) Field of Classification Search ............ 358/1.1, 358/1.15, 1.5; 379/373.02
See application file for complete search history.

(56) References Cited

U.S. PATENT DOCUMENTS 7,050,573 B2  5/2006  Okazaki et al.

FOREIGN PATENT DOCUMENTS

| GB | 2 220 822 A | 1/1990 |
|---|---|---|
| JP | 02-022952 A | 1/1990 |
| JP | 02-078349 A | 3/1990 |
| JP | 02-070555 A | 9/1990 |
| JP | 04-241548 A | 8/1992 |
| JP | 05-344234 A | 12/1993 |
| JP | 2000316038 | 11/2000 |
| JP | 2001-308978 A | 11/2001 |
| JP | 2001308978 | * 11/2001 |
| JP | 2001333143 | 11/2001 |
| JP | 2002-152329 A | 5/2002 |
| JP | 2002-314645 A | 10/2002 |

OTHER PUBLICATIONS

Notification of Reasons of Rejection dispatched Apr. 8, 2008 in Application No. 2006-259118 and English translation thereof.

* cited by examiner

*Primary Examiner* — King Poon
*Assistant Examiner* — Iriana Cruz
(74) *Attorney, Agent, or Firm* — Banner & Witcoff, Ltd.

(57) ABSTRACT

An output system comprising an information reproduction device and an electronic device is provided. In the system, the electronic device comprises a first connection interface through which a command signal is transmitted and a reproduced signal is inputted, a command output unit to transmit the command signal for instructing execution of a reproduction process in response to occurrence of a predetermined event, and an output control unit to output reproduced information which is reproduced by the information reproduction device and corresponds to the reproduced signal. The information reproduction device comprises a second connection interface to interface the information reproduction device with the first connection interface, a storage unit storing information to be subjected to the reproduction process, a reproduction unit to execute the reproduction process, and a reproduction signal output unit to cause the reproduction unit to execute the reproduction process and to transmit the reproduced signal.

21 Claims, 13 Drawing Sheets

OUTPUT SYSTEM AND DEVICE FOR INFORMATION REPRODUCTION

CROSS-REFERENCE TO RELATED APPLICATION

This application claims priority under 35 U.S.C. §119 from Japanese Patent Applications No. 2006-152299, filed on May 31, 2006, and No. 2006-259118, filed on Sep. 25, 2006. The entire subject matter of the applications is incorporated herein by reference.

BACKGROUND

1. Technical Field

Aspects of the present invention relate to a device having a function of outputting sound (or a moving image) when a certain event occurs.

2. Related Art

Devices having a function of outputting sound when a certain event occurs are widely used. For example, a telephone has a function of outputting sound when receiving a call, and an alarm clock has a function generating an alarm when a predetermined alarm time is reached. Some of such devices are configured to allow a user to select a sound type to be outputted.

In general, such devices are configured to have a memory in which sound data to be outputted as sound is stored, or are configured to have an interface to which an external memory in which sound data is stored can be connected. In the device, when a certain event occurs, sound data stored in the memory or the external memory is reproduced and a reproduced signal is inputted to an internal speaker to output sound corresponding to the sound data. An example of such a device is disclosed in Japanese Patent Provisional Publication No. 2001-333143A.

A system having a telephone and a sound generation device has bee proposed. In this system, the sound generation system is connected to the telephone so that the number of sound types to be used as call sound indicating reception of a call can be increased. More specifically, in this system, the telephone sends a signal representing reception of a call to the sound generation device when receiving a call, and then the sound generation device outputs sound via an internal speaker provided in the sound generation device. That is, the sound generation device reproduces sound data stored in an internal memory which is provided in the sound generation device to output sound corresponding to the sound data via the internal speaker of the sound generation device. An example of such a device is disclosed in Japanese Patent Provisional Publication No. 2000-316038A.

SUMMARY

Aspects of the present invention are advantageous in that an output system capable of providing a wide selectivity range in terms of data types to be reproduced while outputting at least one of sound and a moving image in a suitable manner for a user.

BRIEF DESCRIPTION OF THE ACCOMPANYING DRAWINGS

DETAILED DESCRIPTION

General Overview

Figure 1:
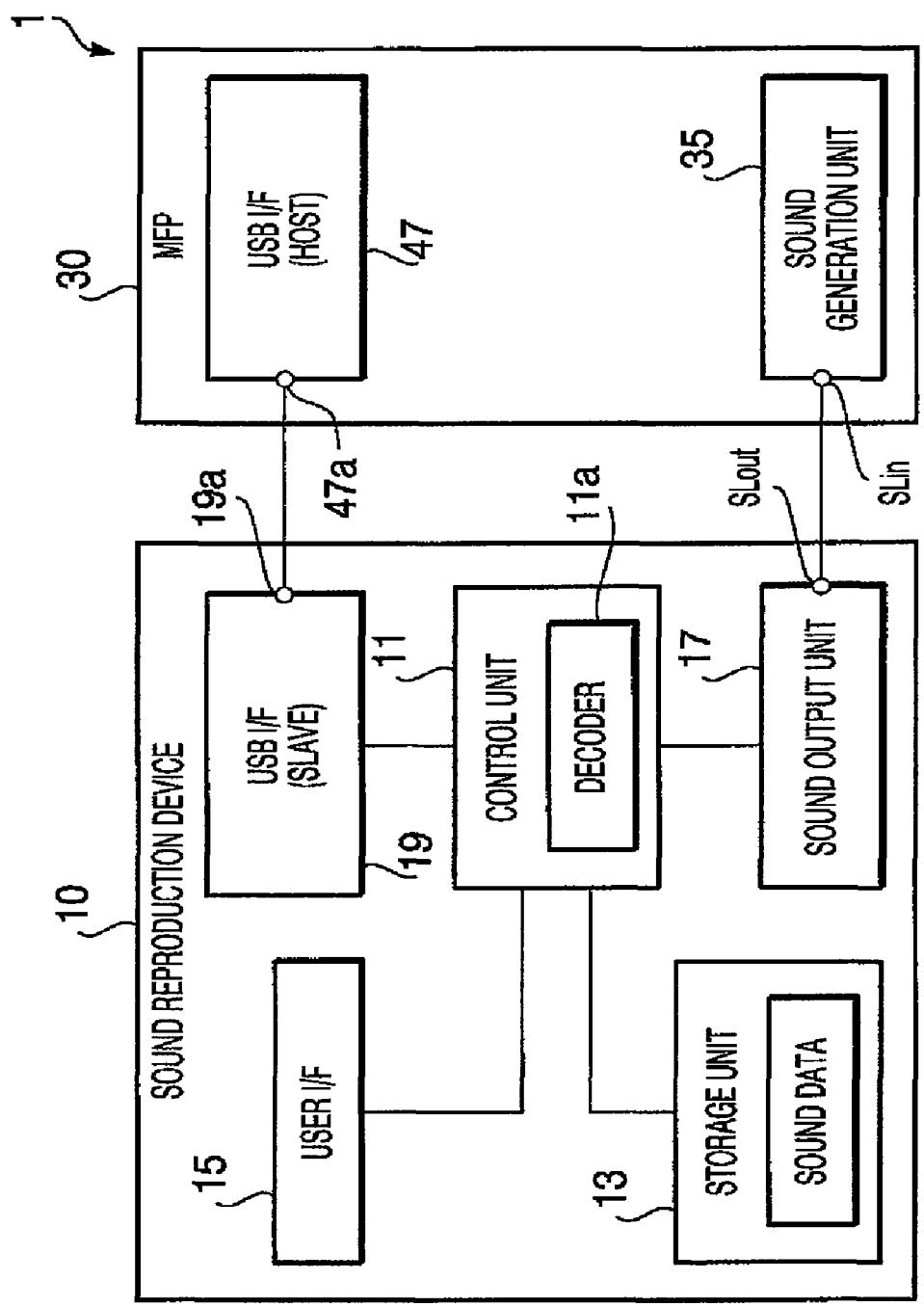
FIG. 1 is a block diagram of a sound output system according to an embodiment.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided an output system comprising an information reproduction device and an electronic device. In this system, the electronic device comprises a first connection interface through which a command signal is transmitted to the information reproduction device and a reproduced signal generated by the information reproduction device is inputted to the electronic device, a command output unit configured to transmit the command signal for instructing the information reproduction device to execute a reproduction process through the first connection interface in response to occurrence of a predetermined event, and an output control unit configured to output reproduced information which is reproduced by the information reproduction device and corresponds to the reproduced signal received through the first connection interface from the information reproduction device in response to transmission of the command signal. The information reproduction device comprises a second connection interface configured to interface the information reproduction device with the first connection interface of the electronic device, a storage unit storing information to be subjected to the reproduction process, a reproduction unit configured to execute the reproduction process for the information stored in the storage unit, and a reproduction signal output unit configured to cause the reproduction unit to execute the reproduction process and to transmit the reproduced signal corresponding to the reproduced information generated by the reproduction unit, in response to receipt of the command signal through the second connection interface.

Such a configuration eliminates the need for providing the reproduction function of reproducing information (e.g., sound data or moving image data) in the electronic device because the electronic device is able to utilize the reproduction function of the information reproduction device. Therefore, it is possible to achieve a wide selectivity range in terms of data types to be reproduced while making it possible to output various types of sound (or moving images) in a suitable manner for a user.

By contrast, conventional devices having a function of outputting sound have drawbacks as follows. If a device (e.g., a telephone) is configured such that, when an event occurs, the device receives sound data from an external memory connected thereto and reproduces the sound data to output sound corresponding to the event through an internal speaker, the device needs to have a decoder for decoding the sound data. Since various types of sound data formats are in practical use, the decoder provided in the device is also required to support the various types of sound data formats. It is understood that to support various types of sound data formats increases cost of the device. The decoder in the device is also required to support a new sound data format which will be proposed in the future. However, it is difficult to configure the decoder provided in the device to support new sound data formats which will be provided in the future.

If a telephone is used with an external sound generation device so that a certain type of sound is reproduced from the external sound generation device when the telephone receives a call, it becomes possible to enhance selectivity of sound types to be reproduced when an incoming call occurs. The reason is that the decoder, which is provided in the replaceable external sound generation device and is not an internal component of the telephone, can be used for reproduction of sound data. However, in this case sound is outputted from the external sound generation device, i.e., from a device different from the telephone. Therefore, a user may feel a sense of discomfort.

It is understood that according to the above mentioned output system, such drawbacks of the conventional devices can be solved.

In at least one aspect, the first connection interface includes a first interface through which the command signal is transmitted and a second interface through which the reproduced signal is inputted. In this case, the command output unit transmits the command signal through the first interface, and the output control unit outputs the reproduced information through the second interface.

In at least one aspect, the electronic device further comprises: a first judging unit configured to judge whether the information reproduction device is connected to the electronic device through the first interface; and a second judging unit configured to judge whether the information reproduction device is connected to the electronic device through the second interface. In this configuration, only if both of the first judging unit and the second judging unit judge that the information reproduction device is connected to the electronic device, the command output unit operates to transmit the command signal and the output control unit operates to output the reproduced information.

In at least one aspect, the information stored in the storage unit of the information reproduction device includes sound data. In this case, the reproduction unit executes the reproduction process for reproducing the sound data stored in the storage unit, and the reproduced signal transmitted by the reproduction signal output unit corresponds to the reproduced sound data generated by the reproduction unit.

In at least one aspect, the electronic device comprises a speaker. In this case, the output control unit of the electronic device inputs the reproduced signal to the speaker so that sound represented by the reproduced signal is outputted through the speaker.

Such a configuration makes it possible to achieve a wide selectivity range in terms of sound data types to be reproduced. Since the sound is outputted from the speaker provided in the electronic device, it is possible to output sound without causing the user to have uncomfortable feeling when the predetermined event occurs.

In at least one aspect, the electronic device has a telephone function. In this case, the command output unit transmits the command signal to the information reproduction device in response to occurrence of the predetermined event in a state where the electronic device is connected to an external telephone via a public switched telephone network. The output control unit transmits the reproduced signal to the external telephone via the public switched telephone network so that sound represented by the reproduced signal is outputted on the external telephone.

With this configuration, it is possible to output sound from the external telephone when the predetermined event occurs on the electronic device. That is, it is possible to output sound on the external telephone without configuring the electronic device to have the sound reproduction function.

In at least one aspect, the electronic device comprises a song list request unit configured to transmit a request for a song list to the information reproduction device. In addition, the information reproduction device further comprises a song list providing unit configured to transmit the song list listing song titles stored in the storage unit as the sound data, in response to receipt of the request from the electronic device.

In at least one aspect, the command signal transmitted by the command output unit of the electronic device includes a code instructing execution of the reproduction process and a code designating a title to be reproduced. In this case, the reproduction unit executes the reproduction process for reproducing the sound data corresponding to the title designated by the command signal.

According to another aspect of the invention, there is provided an electronic device for use with an information reproduction device. The electronic device comprises a connection interface through which a command signal is transmitted to the information reproduction device and a reproduced signal generated by the information reproduction device is inputted to the electronic device, a command output unit configured to transmit the command signal for instructing the information reproduction device to execute a reproduction process through the connection interface in response to occurrence of a predetermined event, and an output control unit configured to output reproduced information which is reproduced by the information reproduction device and corresponds to the reproduced signal received through the connection interface from the information reproduction device in response to transmission of the command signal.

Such a configuration eliminates the need for providing the reproduction function of reproducing information (e.g., sound data or moving image data) in the electronic device because the electronic device is able to utilize the reproduction function of the information reproduction device. Therefore, it is possible to achieve a wide selectivity range in terms of data types to be reproduced while making it possible to output various types of sound (or moving images) in a suitable manner for a user.

In at least one aspect, the connection interface includes a first interface through which the command signal is transmitted and a second interface through which the reproduced signal is inputted. In this case, the command output unit transmits the command signal through the first interface, and the output control unit outputs the reproduced information through the second interface.

In at least one aspect, the electronic device further comprises: a first judging unit configured to judge whether the information reproduction device is connected to the electronic device through the first interface; and a second judging unit configured to judge whether the information reproduction device is connected to the electronic device through the second interface. In this configuration, only if both of the first judging unit and the second judging unit judge that the information reproduction device is connected to the electronic device, the command output unit operates to transmit the command signal and the output control unit operates to output the reproduced information.

In at least one aspect, the reproduced signal inputted through the connection interface corresponds to reproduced sound data generated by the information reproduction device.

In at least one aspect, the electronic device comprises a speaker. In this case, the output control unit inputs the reproduced signal to the speaker so that sound represented by the reproduced signal is outputted through the speaker.

Such a configuration makes it possible to achieve a wide selectivity range in terms of sound data types to be reproduced. Since the sound is outputted from the speaker provided in the electronic device, it is possible to output sound without causing the user to have uncomfortable feeling when the predetermined event occurs.

In at least one aspect, the electronic device has a telephone function. In this case, the command output unit transmits the command signal to the information reproduction device in response to occurrence of the predetermined event in a state where the electronic device is connected to an external telephone via a public switched telephone network. The output control unit transmits the reproduced signal to the external telephone via the public switched telephone network so that sound represented by the reproduced signal is outputted on the external telephone.

With this configuration, it is possible to output sound from the external telephone when the predetermined event occurs on the electronic device. That is, it is possible to output sound on the external telephone without configuring the electronic device to have the sound reproduction function.

In at least one aspect, the electronic device comprises a communication interface that interfaces the electronic device with a communication line. In this case, the command output unit transmits the command signal for instructing the information reproduction device to reproduce sound data, in response to receipt of an incoming call from the communication line. The output control unit inputs the reproduced signal to the speaker so that sound represented by the reproduced signal is outputted through the speaker as call sound.

With this configuration, it is possible to output call sound without causing the user to have uncomfortable feeling when an incoming call is received.

In at least one aspect, the electronic device has a telephone function. In this case, the command output unit transmits the command signal for instructing the information reproduction device to reproduce sound data, in response to a fact that the electronic device moves to a voice communication state. The output control unit inputs the reproduced signal to the speaker so that sound represented by the reproduced signal is outputted through the speaker as background music for voice communication.

With this configuration, the electronic device is able to output various types of background music regardless of the sound data format of the sound data to be reproduced.

In at least one aspect, the electronic device has a function as an alarm clock. In this case, the command output unit transmits the command signal for instructing the information reproduction device to reproduce sound data when a predetermined alarm time is reached. The output control unit inputs the reproduced signal to the speaker so that sound represented by the reproduced signal is outputted through the speaker as alarm sound.

With this configuration, the electronic device is able to output various types of alarm sound regardless of the sound data format of the sound data to be reproduced.

In at least one aspect, the connection interface has a first interface through which the command signal is transmitted and a second interface through which the reproduced signal is inputted to the electronic device, and the second interface is a line input terminal to which a sound signal corresponding to the reproduced signal is inputted from the information reproduction device. Further, the output control unit includes a transmission path formation unit capable of forming a transmission path to the speaker, and the output control unit controls the transmission path formation unit to form a transmission path from the line input terminal to the speaker when the sound represented by the reproduced signal is outputted through the speaker.

Such a configuration makes it possible to prevent the sound corresponding to the reproduced signal from being outputted from the speaker during a time period corresponding to the event.

In at least one aspect, the electronic device comprises an internal signal generation unit configured to generate a sound signal, and a judgment unit configured to judge whether the information reproduction device is connected to the connection interface. Further, the output control unit causes the internal signal generation unit to generate the sound signal and inputs the sound signal generated by the internal signal generation unit to the speaker so that sound corresponding to the sound signal generated by the internal signal generation unit is outputted through the speaker in place of the sound corresponding to the reproduced signal, if the judgment unit judges that the information reproduction device is not connected to the connection interface.

In this configuration, if the information reproduction device is not connected to the connection interface, the internally-generated sound is outputted from the speaker upon occurrence of the predetermined event. Therefore, it is possible to prevent the problem, that no sound is outputted from the speaker, from occurring when the predetermined event occurs.

In at least one aspect, the electronic device comprises an internal signal generation unit configured to generate a sound signal, a first judgment unit configured to judge whether the information reproduction device is connected to the first interface, and a second judgment unit configured to judge whether the information reproduction device is connected to the second interface. In this case, the output control unit causes the internal signal generation unit to generate the sound signal and inputs the sound signal generated by the internal signal generation unit to the speaker so that sound corresponding to the sound signal generated by the internal signal generation unit is outputted through the speaker in place of the sound corresponding to the reproduced signal, if the first judgment unit judges that the information reproduction device is not connected to the first interface or if the second judgment unit judges that the information reproduction device is not connected to the second interface.

In this configuration, if the information reproduction device is not connected to the first interface or if the information reproduction device is not connected to the second interface, the internally-generated sound is outputted from the speaker upon occurrence of the predetermined event. Therefore, it is possible to prevent the problem, that no sound is outputted from the speaker, from occurring when the predetermined event occurs.

In at least one aspect, the telephone function includes a function of accepting an operation for holding. In this case, the command output unit transmits the command signal for instructing the information reproduction device to reproduce sound data, in response to acceptance of the operation for holding. Further, the output control unit transmits the reproduced signal to the external telephone via the public switched telephone network so that the sound represented by the reproduced signal is outputted on the external telephone as holding sound.

With this configuration, it is possible to enhance the degree of selectivity of holding sound and to output desired holding sound from the external telephone.

According to another aspect of the invention, there is provided a computer readable medium having computer readable instruction stored thereon, which, when executed by a processor of an electronic device for use with an information reproduction device, configures the processor to perform the steps of: transmitting a command signal for instructing the information reproduction device to execute a reproduction process through a connection interface provided in the electronic device in response to occurrence of a predetermined event; and outputting at least one of sound and a moving image corresponding to a reproduced signal which is received through the connection interface from the information reproduction device in response to transmission of the command signal.

Such a configuration eliminates the need for providing the reproduction function of reproducing information (e.g., sound data or moving image data) in the electronic device because the electronic device is able to utilize the reproduction function of the information reproduction device. Therefore, it is possible to achieve a wide selectivity range in terms of data types to be reproduced while making it possible to output various types of sound (or moving images) in a suitable manner for a user.

Embodiment

Hereafter, an embodiment according to the invention will be described with reference to the accompanying drawings.

FIG. 1 is a block diagram of a sound output system 1 according to an embodiment. As shown in FIG. 1, the sound output system 1 includes a digital multifunction peripheral 30 (hereafter, referred to as an MFP 30) and a sound reproduction device 10. The MFP 30 has functions as a telephone and a facsimile device. The sound reproduction device 10 is configured as a portable device. In the sound output system 1, the sound reproduction device 10 is connected to the MFP 30.

As shown in FIG. 1, the sound reproduction device 10 includes a control unit 11 (e.g., a microcomputer chip), a storage unit 13 (e.g., a flash memory or a hard disk drive) for storing sound data, a user interface 15 including a display and operation keys, a sound output unit 17, a USB (Universal Serial Bus) interface 19 functioning as a USB slave. The sound output unit 17 includes a D-A (digital-to-analog) converter (not shown) and a line output terminal (SLout).

The sound reproduction device 10 reads sound data designated by a user through the user interface 15 from the storage unit 13, and reproduces the sound data. To reproduce sound data, the control unit 11 controls a decoder 11a to decode the sound data. The decoder 11a generates a decoded signal. The decoded signal is then inputted to the sound output unit 17. The sound output unit 17 executes signal processing on the decoded signal from the control unit 11 to convert the decoded signal to an analog sound signal to be outputted from the SLout terminal. If a head phone is connected to the SLout terminal of the sound reproduction device 10, sound is outputted through the head phone.

By connecting a USB interface of an information processing device (e.g., MFP 30) functioning as a USB host to a USB interface connector 19a of the sound reproduction device 10 through a USB cable, the sound reproduction device 10 becomes able to communicate with the information processing device (e.g., MFP 30).

In the sound output system 1, a USB interface 47 of the MFP 30 functioning as a USB host is connected to the USB interface connector 19a of the sound reproduction device 10 via a USB cable.

The sound reproduction device 10 executes various types of processes in accordance with the type of a command from the information processing device (e.g., MFP 30) connected thereto. For example, the sound reproduction device 10 has a function of reproducing sound data and a function of providing a list of titles regarding sound data stored in the storage unit 13 to a sender (e.g., the MFP 30) of a commend, in response to receipt of the command from the sender.

Figure 2:
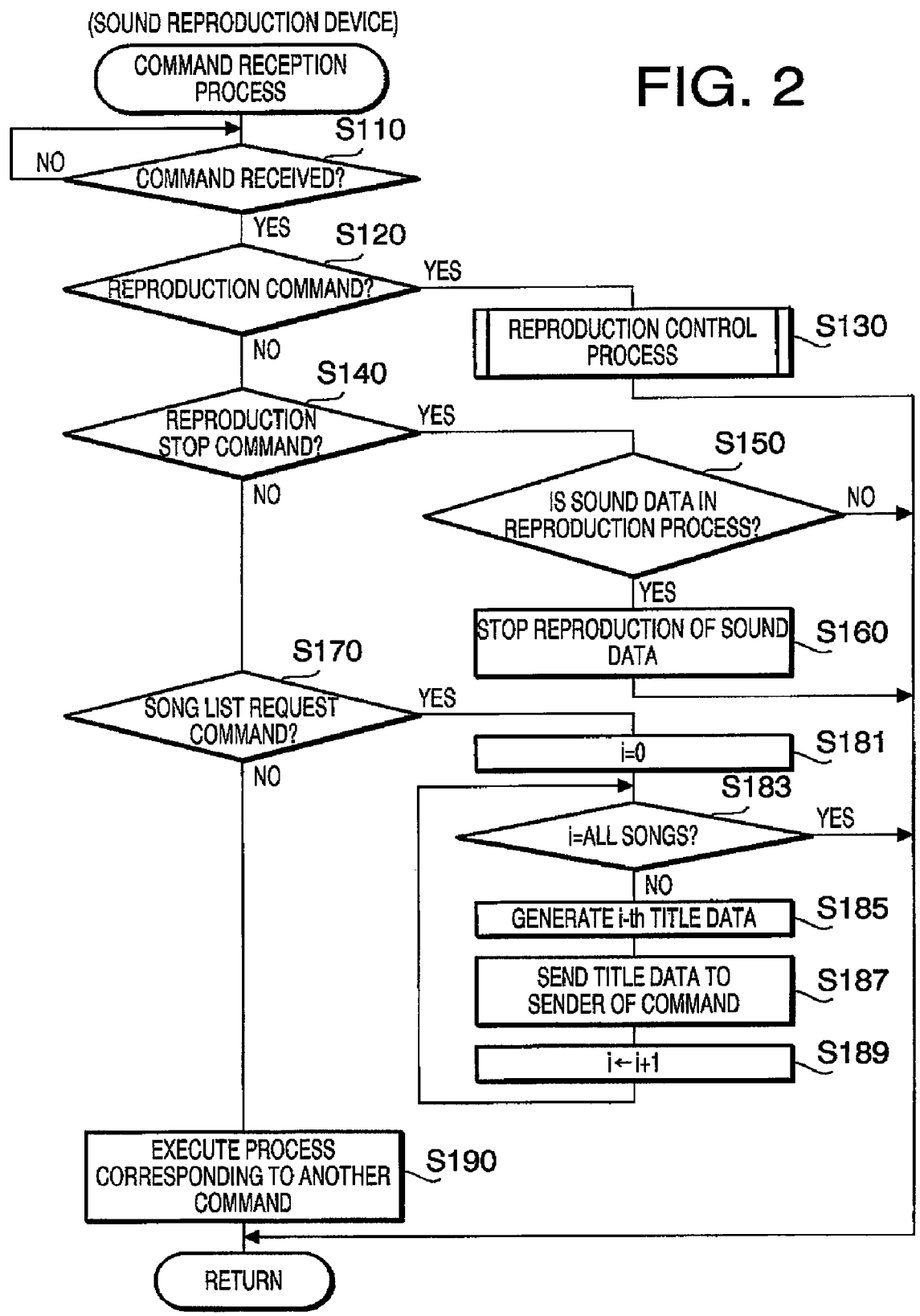
FIG. 2 is a flowchart illustrating a command reception process to be executed by a sound reproduction device provided in the sound output system.

FIG. 2 is a flowchart illustrating a command reception process to be executed under control of the control unit 11 of the sound reproduction device 10. The command reception process is executed repeatedly on the sound reproduction device 10. When the command reception process is initiated, the control unit 11 waits until a command is received (step S110: NO). When a command is received (S110: YES), the control unit 11 judges whether the received command is a reproduction command (step S120). The reproduction command is a command for instructing the sound reproduction device 10 to execute reproduction of sound data.

More specifically, the reproduction command contains command type information representing the command type (i.e., the reproduction command), designation type information representing a designation type for sound data, and title designation information. The designation type information is one of a file designation type indicating that sound data is to be designated by a file name, a title designation type indicating that sound data is to be designated by a title, and an index designation type indicating that sound data is to be designated by an index number. FIGS. 3A, 3B, 3C and 3D illustrate data structures of a reproduction command.

Figure 3A:
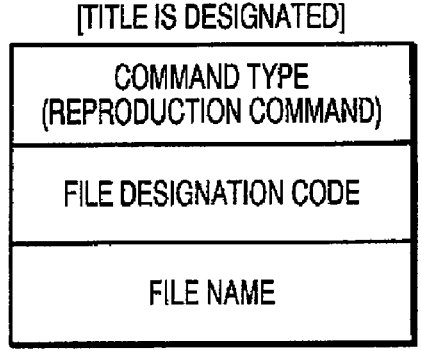
FIGS. 3A, 3B, 3C and 3D illustrate examples of a data structure of a reproduction command.

FIG. 3A illustrates a data structure of a reproduction command whose designation type is a file designation type. As shown in FIG. 3A, the reproduction command has data indicating that the command type is the reproduction command, data indicating that the designation type is the file designation type, and data indicating a fine name of sound data to be reproduced.

Figure 3B:
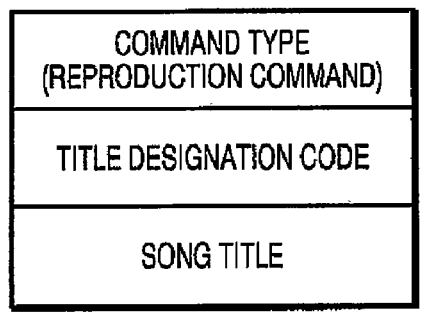

FIG. 3B illustrates a data structure of a reproduction command whose designation type is a title designation type. As shown in FIG. 3B, the reproduction command has data indicating that the command type is the reproduction command, data indicating that the designation type is the title designation type, and data indicating a title of sound data to be reproduced.

Figure 3C:
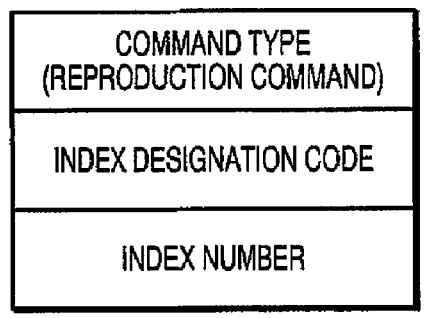

FIG. 3C illustrates a data structure of a reproduction command whose designation type is an index designation type. As shown in FIG. 3C, the reproduction command has data indicating that the command type is the reproduction command, data indicating that the designation type is the index designation type, and data indicating an index number of sound data to be reproduced.

Figure 3D:
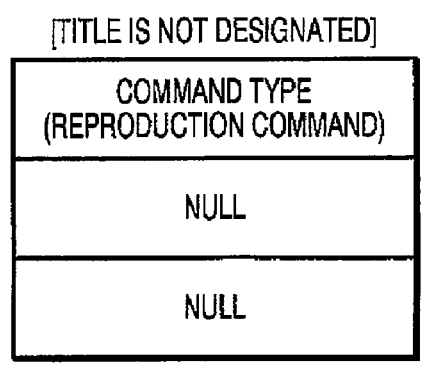

FIG. 3D illustrates another type of reproduction command. As shown in FIG. 3D, the reproduction command of this type includes data indicating that the command type is the reproduction command, and two pieces of null data respectively corresponding to a designation type and a title. That is, the reproduction command shown in FIG. 3D indicates that no title is designated. The sound reproduction device 10 is able to recognize and treat all of the above mentioned reproduction commands.

Figure 4:
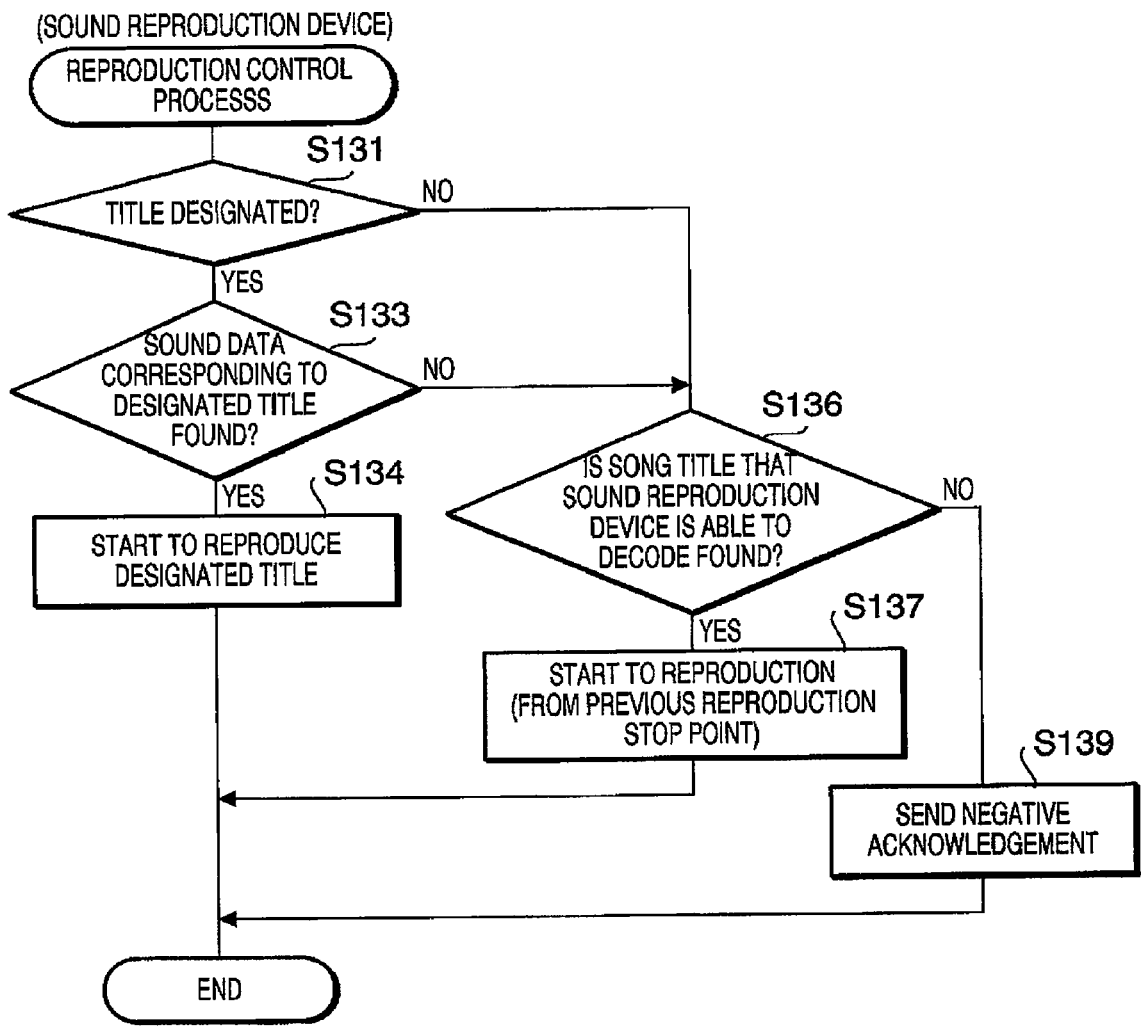
FIG. 4 is a flowchart illustrating a reproduction control process executed in the command reception process.

If it is judged in step S120 that the received command is a reproduction command (S120: YES), control proceeds to step S130 where the control unit 11 executes a reproduction control process shown in FIG. 4. When the reproduction control process is initiated, the control unit 11 judges whether the reproduction command designates a title (S131). If the reproduction command designates a title (S131: YES), the control unit 11 searches the storage unit 13 for sound data designated by the designation type information and the title designation information contained in the received reproduction command (step S133).

If the designated title is found in the storage unit 13 (S133: YES), the control unit 11 reads the sound data corresponding to the designated title from the storage unit 13, and controls the decoder 11a to decode the sound data. The decoded signal is then inputted to the sound output unit 17. The decoded signal is processed in the sound output unit 17, and a sound signal is outputted through the SLout terminal (step S134). Before processing step S134, the control unit 11 may transmit an acknowledge response to the sender (i.e., the MFP 30) of the reproduction command through the USB interface 19 so as to notify the sender (i.e., the MFP 30) of start of a reproduction process for sound data. After step S134 is processed, control exits the reproduction control process while the reproduction process is executed by the decoder 11a.

If the reproduction command is the type not having a designated title (S131: NO) or the title designated in the reproduction command is not found in the storage unit 13 (S133: NO), control proceeds to step S136 where the control unit 11 judges whether at least one title, which the control unit 11 (i.e., the decode 11a) is able to decode, is stored in the storage unit 13. If at least one title, which the control unit 11 (i.e., the decode 11a) is able to decode, is stored in the storage unit 13 (S136:YES), the control unit 11 starts the reproduction process from a certain reproduction start point (step S137). The reproduction start point is set at a point (a reproduction stop point) at which a previous reproduction process is finished. The reproduction stop point is saved in the sound reproduction device 10 by the control unit 11 when the previous reproduction process is finished.

Before processing step S137, the control unit 11 may transmit an acknowledge response to the sender (i.e., the MFP 30) of the reproduction command through the USB interface 19 so as to notify the sender (i.e., the MFP 30) of start of a reproduction process for sound data. After step S137 is finished, control exits the reproduction control process while the reproduction process is executed by the decoder 11a.

If it is judged in step S136 that no sound data which the control unit 11 (i.e., the decode 11a) is able to decode is found (S136: NO), the control unit 11 outputs a negative acknowledgement to the sender of the reproduction command through the USB interface 19 to notify the sender that the reproduction command has not been treated. Then, the reproduction control process terminates. After thus terminating the reproduction control process, the command reception process terminates.

If it is judged in step S120 that the received command is not the reproduction command (S120: NO), the control unit 11 judges whether the received command is a reproduction stop command for stopping the reproduction (step S140).

If the received command is the reproduction stop command (S140: YES), the control unit 11 judges whether there is sound data being subjected to the reproduction process (step S150). That is, the control unit 11 judges whether the sound data for which the reproduction process is started in the reproduction control process (S130) is still in the reproduction process. If the control unit 11 judges that there is sound data in the reproduction process (S150: YES), the control unit 11 stops the reproduction process for the sound data (step S160). Then, the command reception process terminates. If there is no sound data in the reproduction process (S150: NO), the command reception process terminates without processing step S160.

If the received command is not the reproduction stop command (S140: NO), the control unit 11 judges whether the received command is a song list request command (S170). If the received command is not the title request command (S170: NO), the control unit 11 executes a process corresponding to the received command (step S190). Then, the command reception process terminates to wait a next command.

If the received command is the title request command (S170: YES), the control unit 11 assigns 0 to i (i=0) (step S181). Then, the control unit 11 judges whether i is equal to the total number M representing the number of titles stored in the storage unit 13 (step S183). If i is not equal to the total number M (S183: NO), the control unit 11 generates title data of sound data whose index number corresponds to i (i.e., title data of i-th sound data) (step S185).

The title data includes an index number of target sound data, a file name of the target sound data, and textual information representing a song title of the target sound data. The sound reproduction device 10 has a list of sound data in the storage unit 13. In the list, a file name, an index number and a song title are associated with each other for each of pieces of sound data. For example, the title data can be generated using the list stored in the storage unit 13, and a song title can be extracted from property information contained in sound data.

After the title data is generated in step S185, the control unit 11 transmits the title data of i-th sound data to the sender of the command through the USB interface 19 (step S187). Then, the control unit 11 increments i by 1 (step S189). Then, control returns to step S183. If it is judged in step S183 that i is equal to the total number M (S183: YES), the command reception process terminates. If i is not equal to the total number M (S183: NO), steps S183 to S189 are repeated so that the title data for all of the pieces of sound data can be transmitted to the sender of the song list request command.

Figure 5:
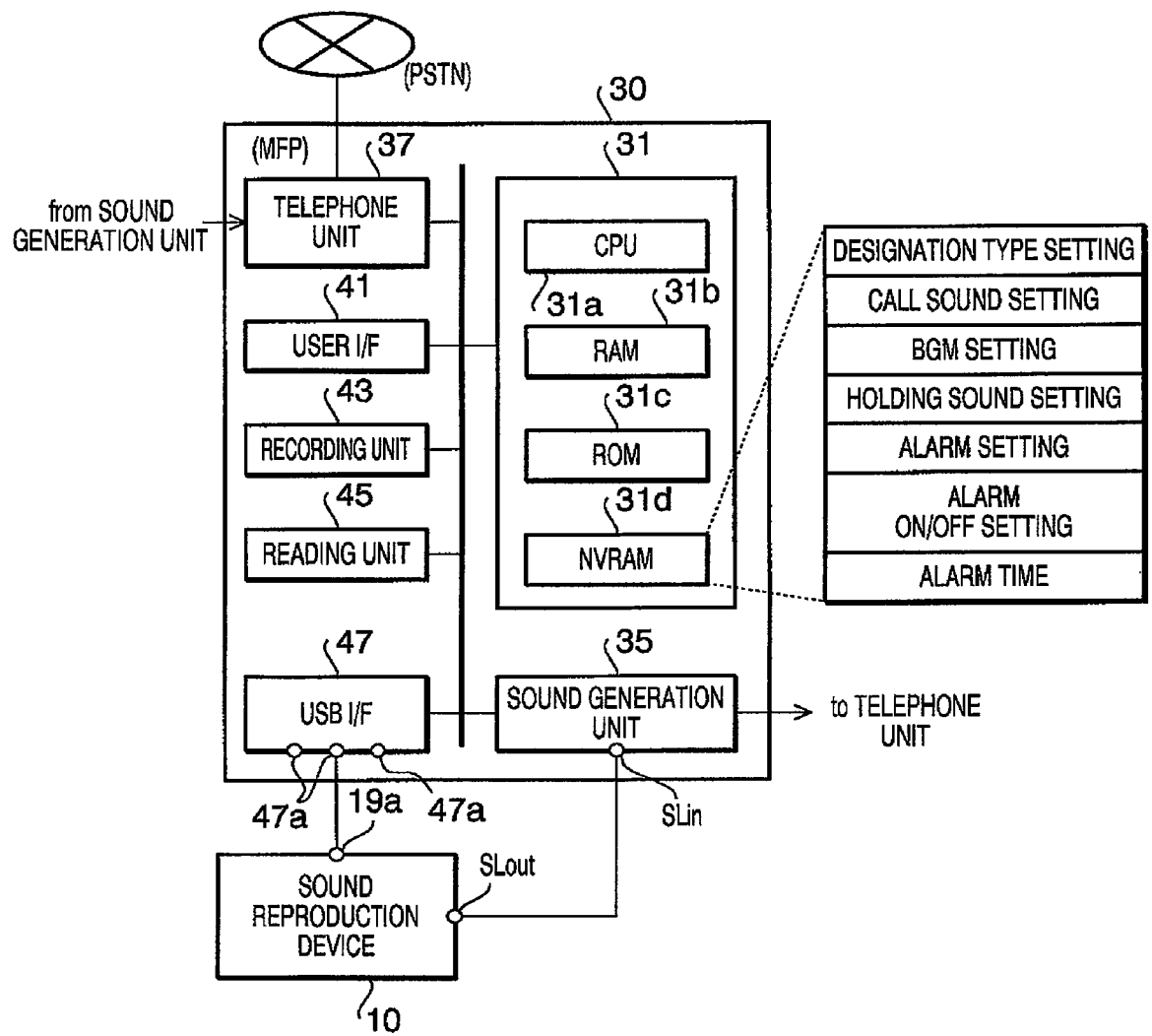
FIG. 5 is a block diagram of an MFP provided in the sound output system.

A configuration and operations of the MFP 30 will now be explained. FIG. 5 is a block diagram of the MFP 30 according to the embodiment. As shown in FIG. 5, the MFP 30 includes a control unit 31, a sound generation unit 35, a telephone unit 37, a user interface 41, a printing unit 43, a reading unit 45, and the USB interface 47 functioning as a USB host. The control unit 31 controls internal components of the MFP 30. As described in detail later, the sound generation unit 35 includes a speaker 35e through which sound such as call sound indicating an incoming call or alarm sound is outputted. The telephone unit 37 has a telephone function for performing telephone communication with an external telephone or an external facsimile device. The user interface 41 includes a display and operation keys to be operated by a user. The printing unit 43 has the function of printing an image such as an image received from an external facsimile device through the telephone unit 37 or an image obtained by the reading unit 45. The reading unit 45 has a scanner function of reading optically an image from an original placed on an original base.

The control unit 31 includes a CPU 31a for executing various programs, a RAM 31b used as a work memory, a ROM 31c storing data and programs to be used by the CPU 31a, and an non-volatile RAM (NVRAM) 31d. When the programs are executed by the CPU 31a, the telephone function, the facsimile function, the copying function, and the alarm function can be achieved. The sound generation unit 35 is configured to output sound through the speaker 35e based on a sound signal inputted to a line input terminal SLin or based on a sound signal generated by a sound signal generator 35a provided in the sound generation unit 35.

Figure 6:
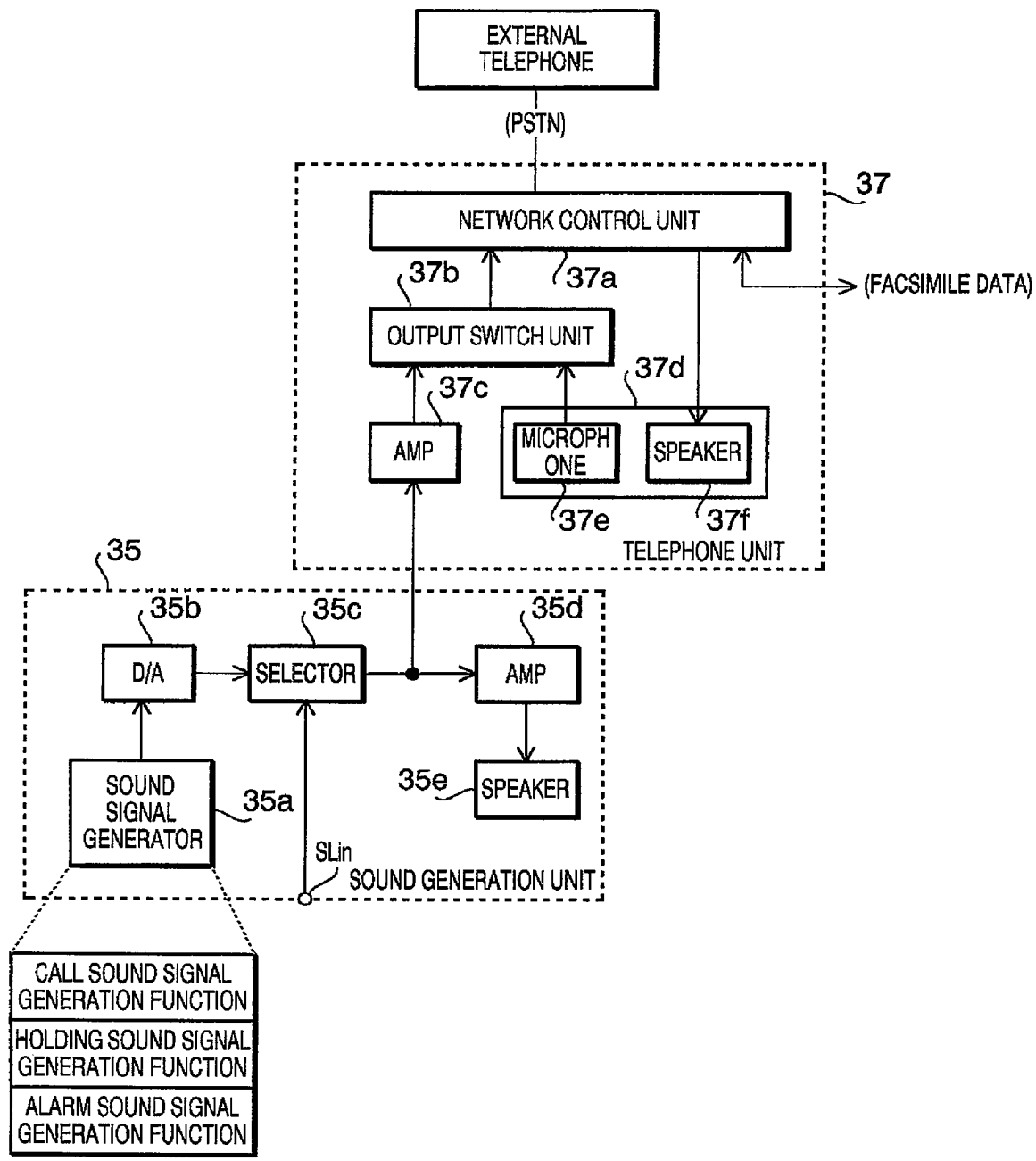
FIG. 6 illustrates block diagrams of a sound generation unit and a telephone unit in the MFP.

As shown in FIG. 6, the sound generation unit 35 includes a D-A converter 35b which converts a digital sound signal generated by the sound signal generator 35a to an analog sound signal, a selector 35c capable of selecting one of inputs of a sound signal generated the sound signal generator 35a and a sound signal inputted from the SLin terminal, and an amplifier 35d which amplifies the sound signal outputted by the selector 35c.

The sound signal generator 35a has a function of generating a sound signal representing an incoming call, a sound signal representing a state of holding, and an alarm sound signal. When controlled by the control unit 31, the sound generator 35a generates one of the above mentioned sound signals, and outputs the generated sound signal as an internal sound signal. The selector 35c has a first operation mode for forming a transmission line between the D-A converter 35b and the amplifier 35d, a second operation mode for forming a transmission line between the SLin terminal and the amplifier 35d, and a non-transmission mode where an output line to the amplifier 35d is cut off so that the sound signals from the D-A converter 35b and from the SLin terminal are not inputted to the amplifier 35d. The sound generator 35a operates in one of the above mentioned three modes under control of the control unit 31.

The telephone unit 37 has a network control unit 37a connected to a PSTN (Public Switched Telephone Network), an output switch unit 37b, an amplifier 37c, and a handset 37d. The network control unit 37a has a function of connecting the telephone unit 37 to or disconnecting the telephone unit 37 from the PSTN. The output switch unit 37b has a function of switching signal types to be sent to an external telephone via the network control unit 37a. The amplifier 37c amplifies the output signal of the selector 35c.

The output switch unit 37b has a first operation mode for transmitting a sound signal representing a holding state to an external telephone via the network control unit 37a, and a second operation mode for transmitting a voice signal representing voice picked up by a microphone 37e of the handset 37d to an external telephone via the network control unit 37a. The control unit 31 switches the operation modes of the output switch unit 37b. In an initial state, the output control unit 37b of the telephone unit 37 operates in the second operation mode so that a voice signal picked up by the microphone 37e is transmitted to an external telephone via the network control unit 37a.

The handset 37d includes a speaker 37f connected to the network control unit 37a, and the microphone 37e which picks up voice of a user. The speaker 37f is used to output voice represented by a voice signal transmitted from an external telephone. The microphone 37e is used to pick up voice of a user and to transmit a voice signal representing the voice to an external telephone.

The USB interface 47 has more than one USB connector 47a to which USB devices functioning as USB slaves are connected via respective USB cables. As shown in FIG. 1, in the sound output system 1, the USB interface 19 of the sound reproduction device 10 is connected to the USB connector 47a of the MFP 30 via a USB cable, and the line output terminal SLout of the sound reproduction device 10 is connected to the line input terminal SLin of the MFP 30 via a signal transmission cable.

Figure 7:
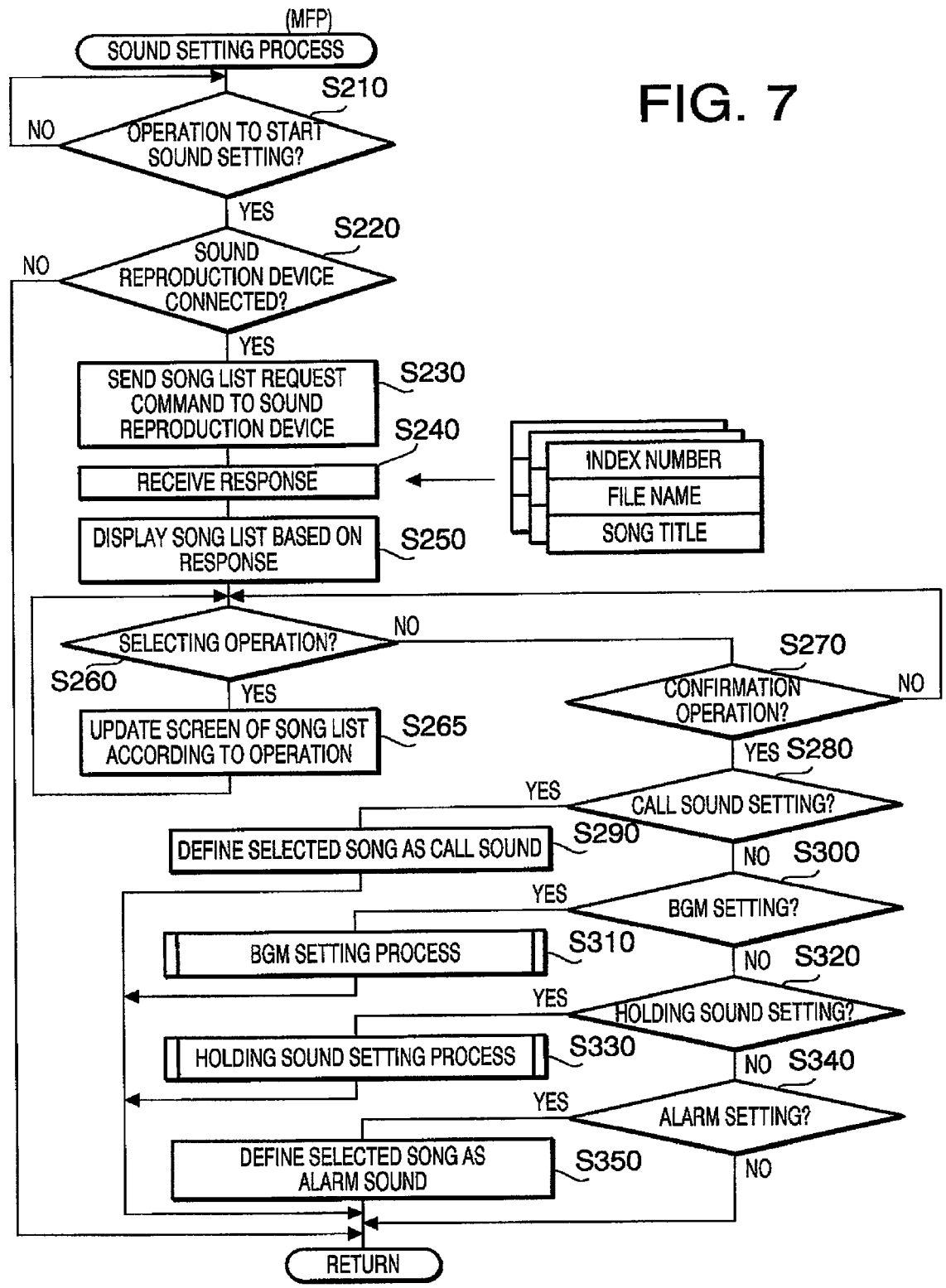
FIG. 7 is a flowchart illustrating a sound setting process executed by the MFP.

Hereafter, processes to be executed on the MFP 30 is explained. FIG. 7 is a flowchart illustrating a sound setting process executed under control of the control unit 31 of the MFP 30. The sound setting process is executed repeatedly on the MFP 30. By executing the sound setting process, the control unit 31 makes settings for sound representing an incoming call, sound representing a holding state, background music and alarm sound. The sound setting process is executed concurrently with a call sound output process, a background music output process, a holding sound output process, and an alarm sound output process which are described later.

When the sound setting process is initiated, the control unit 31 waits until a user operation for starting the sound setting is conducted through the user interface 41 (step S210). The MFP 30 is configured to accept a user operation for starting the call sound setting, a user operation for starting the background music setting, a user operation for starting the holding sound setting, and a user operation for starting the alarm sound setting. That is, in step S210, the control unit 31 waits until one of the above mentioned user operations is conducted by a user through the user interface 41.

When the user operation for starting the sound setting is conducted (S210: YES), the control unit 31 judges whether the sound reproduction device 10 is connected to one of the USB connectors 47a (step S220). The control unit 31 is able to judge whether the sound reproduction device 10 is connected to one of the USB connectors 47a, for example, by obtaining device information from a USB device connected to the USB connector 47a. The control unit 31 may be configured to transmit a query to a USB device connected to the USB connector 47a and to judge whether the USB device is the sound reproduction device 10 based on a response returned from the USB device.

If the sound reproduction device 10 is not connected to the USB connector 47a (S220: NO), control exits the sound setting process. If the sound reproduction device 10 is connected to one of the USB connectors 47a (S220: YES), the control unit 31 transmits a song list request command to the sound reproduction device 10 via the SUB interface 47 (step S230).

Next, the control unit 31 receives a response to the song list request command (step S240). After receiving the response, the control unit 31 displays a song list on the display of the user interface 41 based on data contained in the response (step S250). As described above, the sound reproduction device 10 returns, as a response to the song list request command, title data for each of the song titles stored in the sound reproduction device 10. Therefore, in steps S240 to S250, the control unit 31 receives title data successively from the sound reproduction device 10, and displays the song list listing the song titles of the sound data stored in the sound reproduction device 10.

Next, in step S260, the control unit 31 waits until a user operation for selecting a song tile or a user operation for confirming selection of a song title is conducted through the user interface 41 (S260: NO, S270: NO). If a user operation for selecting a song title is conducted (S260: YES), the control unit 31 updates a screen of the song list in accordance with the user operation (step S265). For example, in step S265, a cursor on the song list is moved in accordance with the user operation, or a display state of a character string corresponding to the selected song title is inversed. After step S265 is processed, control returns to step S260 to further wait until a user operation for selecting a song title or a user operation for confirming the selection is conducted.

If it is judged in step S270 that the user operation for confirming the selection is conducted (S270: YES), control proceeds to step S280 where the control unit 31 judges whether the user operation for starting the sound setting (by which execution of steps S220 to S270 is caused) corresponds to the user operation for starting the call sound setting. If the user operation for starting the sound setting corresponds to the user operation for starting the call sound setting (S280: YES), the control unit 31 defines the selected song title as call sound (step S290). That is, the control unit 31 defines the sound data corresponding to the song title confirmed by the user in step S270 as call sound which is to be designated as call sound when a reproduction command is transmitted to the sound reproduction device 10.

The setting operation in step S290 is conducted by storing an index number, a song title and a file name of the title data corresponding to the selected song title, in the NVRAM 31*d*. After step S290 is processed, control exits the sound setting process to further wait until a user operation for starting the sound setting is conducted (step S210).

Figure 8A:
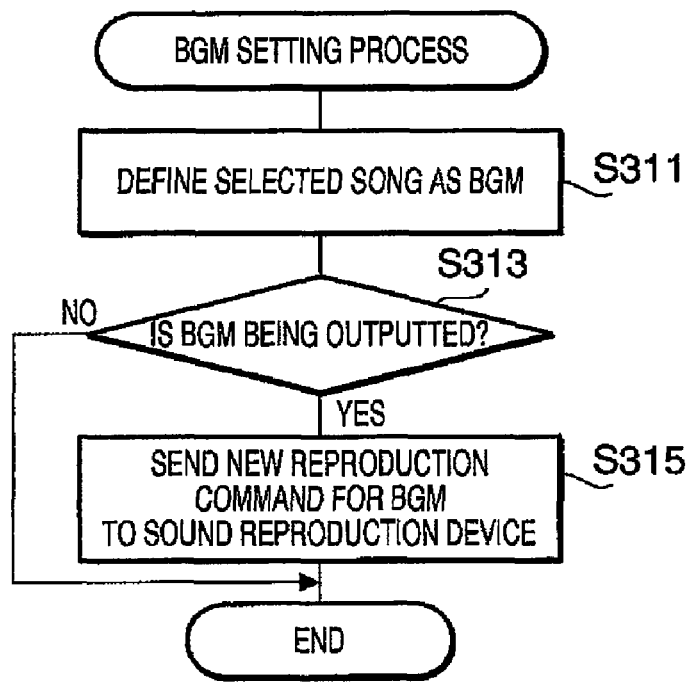
FIG. 8A is a flowchart illustrating a background music setting process executed by the MFP in the sound setting process.

If it is judged in step S280 that the user operation for starting the sound setting does not correspond to the user operation for starting the call sound setting (S280: NO), control proceeds to step S300 where the control unit 31 judges the user operation for starting the sound setting corresponds to the user operation for starting the background music setting. If the user operation for starting the sound setting corresponds to the user operation for starting the background music setting (S300: YES), the control unit 31 executes a background music setting process. FIG. 8A is a flowchart illustrating the background music setting process executed under control of the control unit 31.

When the background music setting process is initiated, the control unit 31 defines a song title selected by a user on the screen of the song list as the background music (step S311). More specifically, the control unit 31 stores an index number, a song title and a file name of title data corresponding to the selected song title, in the NVRAM 31*d*, as background music setting information.

Next, in step S313, the control unit 31 judges whether background music is being outputted via the speaker 35*e*. As described later, background music is outputted via the speaker 35*e* in voice communication. For example, background music is outputted via the speaker 35*e* in the background music output process shown in FIG. 10.

If the background music is being outputted from the speaker 35*e* (S313: YES), the control unit 31 transmits the reproduction command for instructing the sound reproduction device 10 to execute reproduction for sound data corresponding to the newly selected background music, to the sound reproduction device 10 via the USB interface 47 (step S315). That is, the control unit 31 refers to the latest background music setting information and designation type setting information stored in the NVRAM 31*d*, and generates the reproduction command based on such latest information in the NVRAM 31*d*. Then, the control unit 31 transmits the reproduction command to the sound reproduction device 10 via the USB interface 47. Then, the background music setting process terminates.

If it is judged in step S313 that the background music is not being outputted from the speaker 35*e* (S313: NO), control exits the background music setting process without processing step S315. Then, control exits the sound setting process.

Figure 8B:
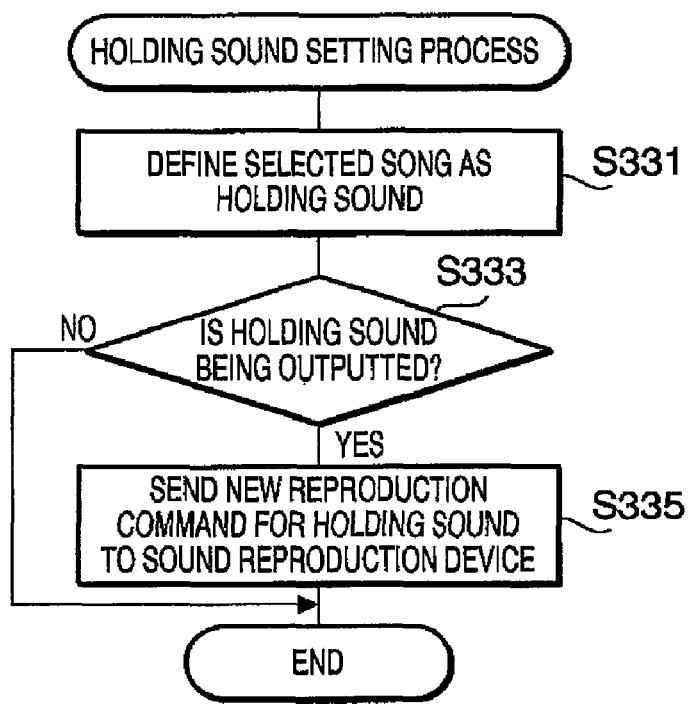
FIG. 8B is a flowchart illustrating a holding sound setting process executed by the MFP in the sound setting process.

If the user operation for starting the sound setting does not correspond to the user operation for starting the background music setting (S300: NO), the control unit 31 judges whether the user operation for starting the sound setting corresponds to the user operation for starting the holding sound setting (step S320). If the user operation for starting the sound setting corresponds to the user operation for starting the holding sound setting (S320: YES), control proceeds to step S330 where the control unit 31 executes a holding sound setting process. FIG. 8B is a flowchart illustrating the holding sound setting process executed under control of the control unit 31.

When the holding sound setting process is initiated, the control unit 31 defines a song title selected by a user on the screen of the song list as the holding sound (step S331). More specifically, the control unit 31 stores an index number, a song title and a file name of title data corresponding to the selected song title, in the NVRAM 31*d*, as holding sound setting information.

Next, in step S333, the control unit 31 judges whether the output signal from the sound reproduction device 10 is being transmitted to an external telephone as a sound signal representing a holding state. As described later, the sound signal representing a holding state is transmitted to an external telephone in the holding sound output process shown in FIGS. 11 and 12.

If the output signal from the sound reproduction device 10 is being transmitted to an external telephone as a sound signal representing a holding state (S333: YES), the control unit 31 transmits the reproduction command for instructing the sound reproduction device 10 to execute reproduction for sound data corresponding to the newly selected holding sound, to the sound reproduction device 10 via the USB interface 47 (step S335). That is, the control unit 31 refers to the latest holding sound setting information and designation type setting information stored in the NVRAM 31*d*, and generates the reproduction command based on such latest information in the NVRAM 31*d*. Then, the control unit 31 transmits the reproduction command to the sound reproduction device 10 via the USB interface 47. Then, the background music setting process terminates.

If it is judged in step S333 that the output signal from the sound reproduction device 10 is not being transmitted to an external telephone as a sound signal representing a holding state (S333: NO), control exits the holding sound setting process without processing step S335. Then, control exits the sound setting process.

If the user operation for starting the sound setting does not correspond to the user operation for starting the holding sound setting (S320: NO), control proceeds to step S340 where the control unit 31 judges whether the user operation for starting the sound setting corresponds to the user operation for starting the alarm sound setting. If the user operation for starting the sound setting corresponds to the user operation for starting the alarm sound setting (S340: YES), the control unit 31 defines a song title selected by a user on the screen of the song list as alarm sound (step S350). Then, the sound setting process terminates.

If it is judged in step S340 that the user operation for starting the sound setting does not correspond to the user operation for starting the alarm sound setting (S340: NO), the sound setting process terminates without processing step S350 to wait until a next user operation for starting sound setting is conducted (S210).

The designation type setting information referred to in the above mentioned sound setting process is updated when the user conducts a user operation for changing the designation type through the user interface 41. The MFP 30 is configured such that the designation type for a song title is changed in accordance with a user operation. When the user operation for changing the designation type is conducted through the user interface 41, the control unit 31 updates the designation type setting information in the NVRAM 31d in accordance with the user operation so that the designation type is changed to one of the file designation type, the title designation type and the index designation type.

Figure 9:
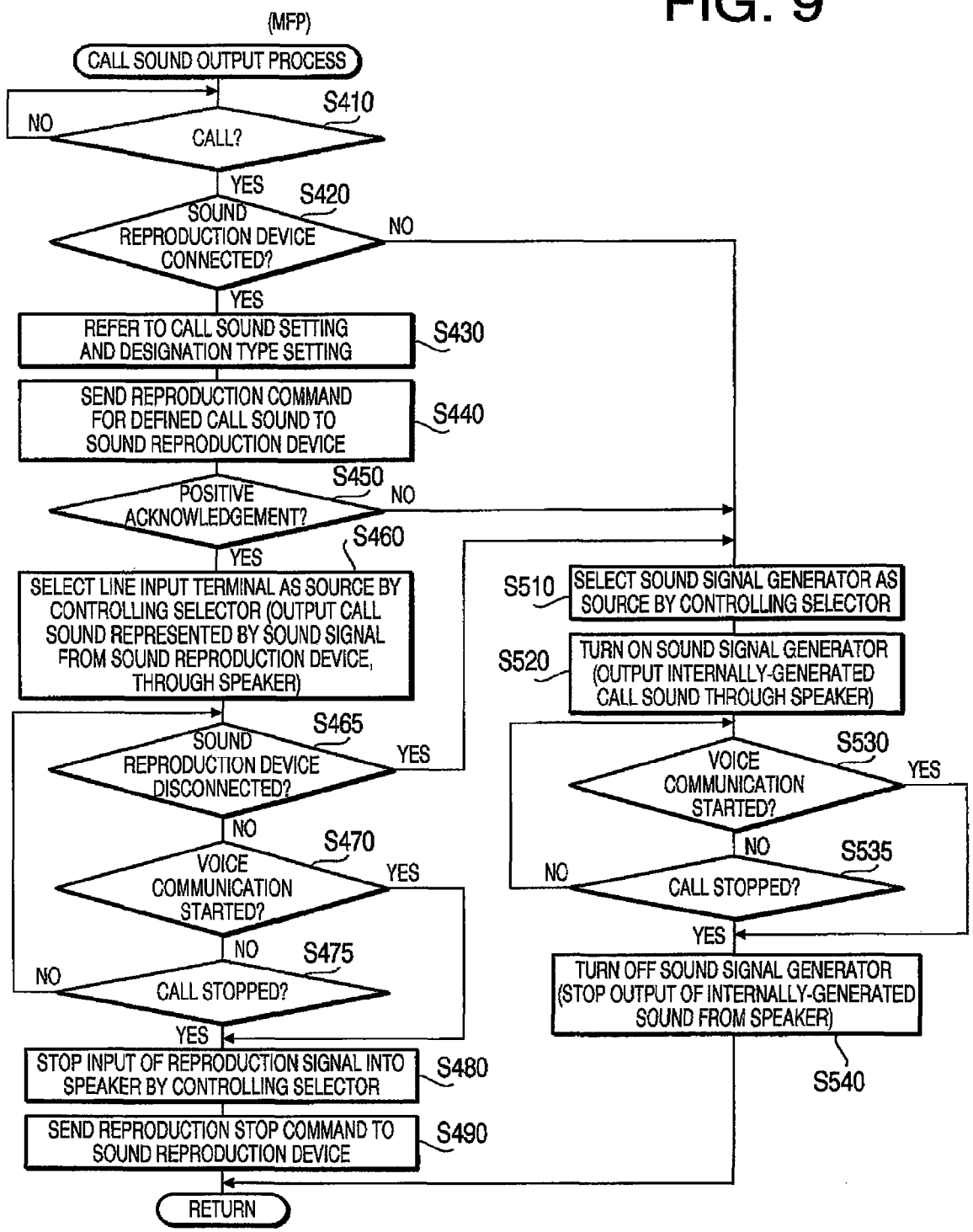
FIG. 9 is a flowchart illustrating a call sound output process executed by the MFP.

Hereafter, a call sound output process executed repeatedly by the control unit 31 of the MFP 30 is explained. FIG. 9 is a flowchart illustrating the call sound output process. As described above, the call sound output process is executed concurrently with the sound setting process, the background music output process, the holding sound output process, and the alarm sound output process.

When the call sound output process is initiated, the control unit 31 waits until the network control unit 37a receives a call from an external telephone or an external facsimile device through the PSTN (step S410). If a call is received (S410: YES), the control unit 31 judges whether the sound reproduction device 10 is connected to one of the USB connectors 47a (step S420).

If the sound reproduction device 10 is connected to one of the USB connectors 47a (S420: YES), control proceeds to step S430 where the control unit 31 refers to the call sound setting information and the designation type setting information stored in the NVRAM 31d, and generates the reproduction command based on such setting information in the NVRAM 31d. Then, the control unit 31 transmits the reproduction command to the sound reproduction device 10 via the USB interface 47 (step S440). More specifically, if the designation type corresponds to the file designation type, the control unit 31 generates the reproduction command in which a code representing the file designation type is described as the designation type, and a file name represented by the call sound setting information is described as the title designation information. The reproduction command generated as above is transmitted to the sound reproduction device 10.

If the designation type information represents the title designation type, the reproduction command, in which a code representing the title designation type as the designation type information and an index number represented by the call sound setting information as the title designation information are described, is generated. Then, the reproduction command is transmitted to the sound reproduction device 10.

If the designation type information represents the index designation type, the reproduction command, in which a code representing the index designation type as the designation type information and an index number represented by the call sound setting information as the title designation information are described, is generated. Then, the reproduction command is transmitted to the sound reproduction device 10.

After step S440 is processed, the control unit 31 judges whether an acknowledgement is received as a response to the reproduction command (step S450). For example, the control unit 31 monitors the line input terminal SLin to detect the sound signal from the sound reproduction device 10. In this case, the control unit 31 judges that the acknowledgement is received if the sound signal is received from the line input terminal SLin, while the control unit 31 judges that the acknowledgement is not received if the sound signal is not received from the line input terminal SLin within a predetermined time period.

Alternatively, the control unit 31 may be configured to receive a response signal from the sound reproduction device 10 via the USB interface 47, as a response to the reproduction command. In this case, the control unit 31 may judge that an acknowledgement is received if the received response signal is an affirmative response, while the control unit 31 may judge that an acknowledgment is not received if the received response is not an affirmative response. The control unit 31 may judge that the acknowledgment is not received if the response signal is not returned from the sound reproduction device 10 within a predetermined time period.

If it is judged in step S450 that an acknowledgment is received as a response to the reproduction command (S450: YES), control proceeds to step S460 where the control unit 31 controls the selector 35c so that a transmission path connecting the line input terminal SLin to the amplifier 35d is formed. That is, in this case, the sound signal inputted through the line input terminal SLin is transmitted to the amplifier 35d.

After the transmission path is thus formed, the sound signal from the sound reproduction device 10 is inputted to the speaker 35e and sound corresponding to the sound signal is outputted from the speaker 35e. As a result, sound of the song title represented by the reproduction command is outputted from the speaker 35e as the call sound.

After step S460 is processed, the control unit 31 waits until the sound reproduction device 10 is disconnected from the USB interface 47, voice communication or facsimile communication is initiated by a user operation (an operation for an handset) or an automatic response function (i.e., a message recording function), or a call is stopped (S465: NO, S470: NO, S475: NO). If the sound reproduction device 10 is disconnected from the SUB interface 71 (S465: YES), control proceeds to step S510.

If voice communication or facsimile communication is initiated or a call is stopped (S470: YES or S475: YES), the control unit 31 controls the selector 35c to set the selector 35c to the non-transmission mode so that the sound signal inputted from the line input terminal SLin is not transmitted to the amplifier 35d (step S480). Consequently, the output of the call sound from the speaker 35e is stopped.

After step S480 is processed, the control unit 31 sends a reproduction stop command to the sound reproduction device 10 via the USB interface 47. Then, control exits the call sound output process to further wait for a next call.

If it is judged in step S420 that the sound reproduction device 10 is not connected to the USB connectors 47a (S420: NO), control proceeds to step S510 where the control unit 31 controls the selector 35c to form a transmission path connecting the sound signal generator 35a to the amplifier 35d so that an internal sound signal from the sound signal generator 35a is transmitted to the amplifier 35d. That is, the selector 35c defines an input terminal connected to the sound signal generator 35a as an input source. When the input terminal connected to the sound signal generator 35a is defined as an input source, the selector 35c does not send the sound signal from the line input terminal SLin to the amplifier 35d.

Next, in step S520, the control unit 31 controls the sound signal generator 35a to enable the call sound generation function of the sound signal generator 35a, so that an internal sound signal (a call sound signal) generated by the sound signal generator 35a is inputted to the speaker 35e. As a result, internally-generated sound (e.g., ringing sound) is outputted from the speaker 35e as call sound.

After step S520 is processed, the control unit 31 waits until voice communication or facsimile communication is started or a call is stopped (S530: NO, S535: NO). If voice communication or facsimile communication is started or a call is stopped (S530: YES or S535: YES), control proceeds to step S540 where the control unit 31 controls the sound signal generator 35a to disable the call sound generation function and to stop the output of the internally-generated sound. Then, control exits the call sound output process to further wait a next call.

Figure 10:
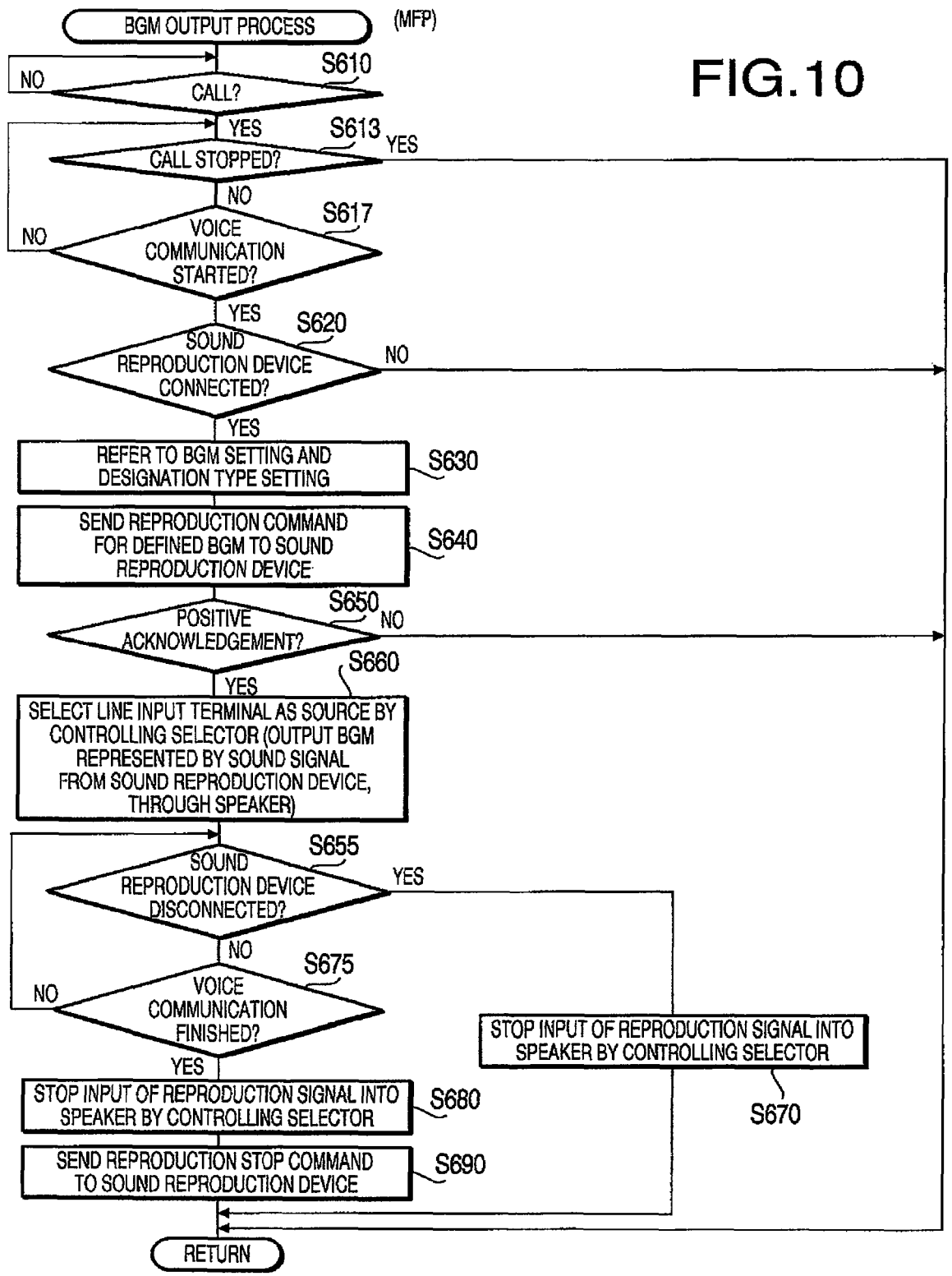
FIG. 10 is a flowchart illustrating a background music output process executed by the MFP.

Hereafter, a background music output process executed repeatedly by the control unit 31 of the MFP 30 is explained. FIG. 10 is a flowchart illustrating the background music output process. As described above, the background music output process is executed concurrently with the sound setting process, the call sound output process, the holding sound output process, and the alarm sound output process.

When the background music output process is initiated, the control unit 31 waits until the network control unit 37a receives a call from an external telephone or an external facsimile device through the PSTN (S610:NO). If a call is received (S610: YES), the control unit 31 waits until voice communication is started upon picking up of the handset 37d or a call is stopped (S613: NO or S617: NO).

If a call is stopped without execution of the voice communication (S613: YES), control exits the background music output process to further wait a next call. If voice communication is started upon picking up of the handset 37d (S617: YES), the control unit 31 judges whether the sound reproduction device 10 is connected to one of the USB connectors 47a in the same manner as step S220 (step S620). If the sound reproduction device 10 is connected to one of the USB connectors 47a (S620: YES), control proceeds to step S630. If the sound reproduction device 10 is not connected to the USB connector 47a (S620: NO), control exits the background music output process.

In step S630, the control unit 31 refers to the background music setting information and the designation type setting information stored in the NVRAM 31d, and generates the reproduction command based on such setting information. Then, the control unit 31 transmits the reproduction command to the sound reproduction device 10 via the USB interface 47 (step S640). More specifically, if the designation type corresponds to the file designation type, the control unit 31 generates the reproduction command in which a code representing the file designation type is described as the designation type, and a file name represented by the background music setting information is described as the title designation information. The reproduction command generated as above is transmitted to the sound reproduction device 10.

After step S640 is processed, the control unit 31 judges whether an acknowledgment is received as a response to the reproduction command in the same manner as step S450 (step S650). For example, the control unit 31 monitors the line input terminal SLin to detect the sound signal from the sound reproduction device 10. In this case, the control unit 31 judges that the acknowledgement is received if the sound signal is received from the line input terminal SLin, while the control unit 31 judges that the acknowledgement is not received if the sound signal is not received from the line input terminal SLin.

If it is judged in step S650 that an acknowledgment is received (S650: YES), control proceeds to step S660. If it is judged in step S650 that an acknowledgment is not received (S650: NO), control exits the background music output process.

In step S660, the control unit 31 controls the selector 35c so that a transmission path connecting the line input terminal SLin to the amplifier 35d is formed. That is, in this case, the sound signal inputted through the line input terminal SLin is transmitted to the amplifier 35d.

After the transmission path is thus formed, the sound signal from the sound reproduction device 10 is inputted to the speaker 35e and sound corresponding to the sound signal is outputted from the speaker 35e. As a result, sound of the song title represented by the reproduction command is outputted from the speaker 35e as background music (BGM).

After step S660 is processed, the control unit 31 waits until the sound reproduction device 10 is disconnected from the USB interface 47a or the line which is connected to an external telephone is disconnected by pulling down the handset 37d (S665: NO, S675: NO).

If the sound reproduction device 10 is disconnected from the USB interface 47a (S665: YES), control proceeds to step S670 where the control unit 31 controls the selector 35c to set the selector 35c to the non-transmission mode so that the sound signal inputted from the line input terminal SLin is not transmitted to the amplifier 35d.

If the line which is connected to an external telephone is disconnected by pulling down the handset 37d (S675: YES), the control unit 31 controls the selector 35c to set the selector 35c to the non-transmission mode and to stop output of the background music from the speaker 35e (step S680). Then, the control unit 31 transmits the reproduction stop command to the sound reproduction device 10 via the USB interface 47 (step S690). Then, control exits the background music output process to further wait for a next call.

Figure 11:
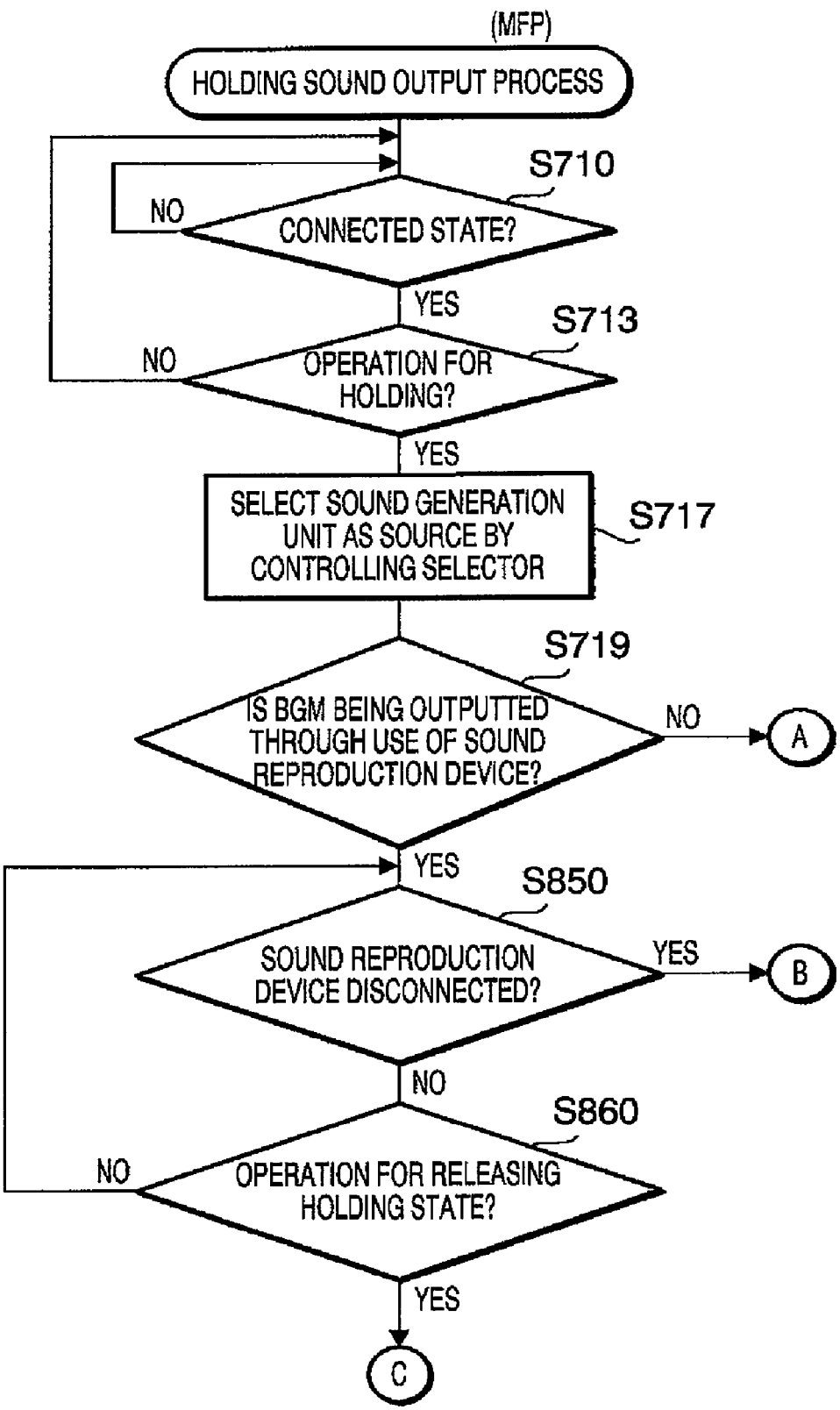
FIGS. 11 and 12 illustrate a flowchart of a holding sound output process executed by the MFP.
Figure 12:
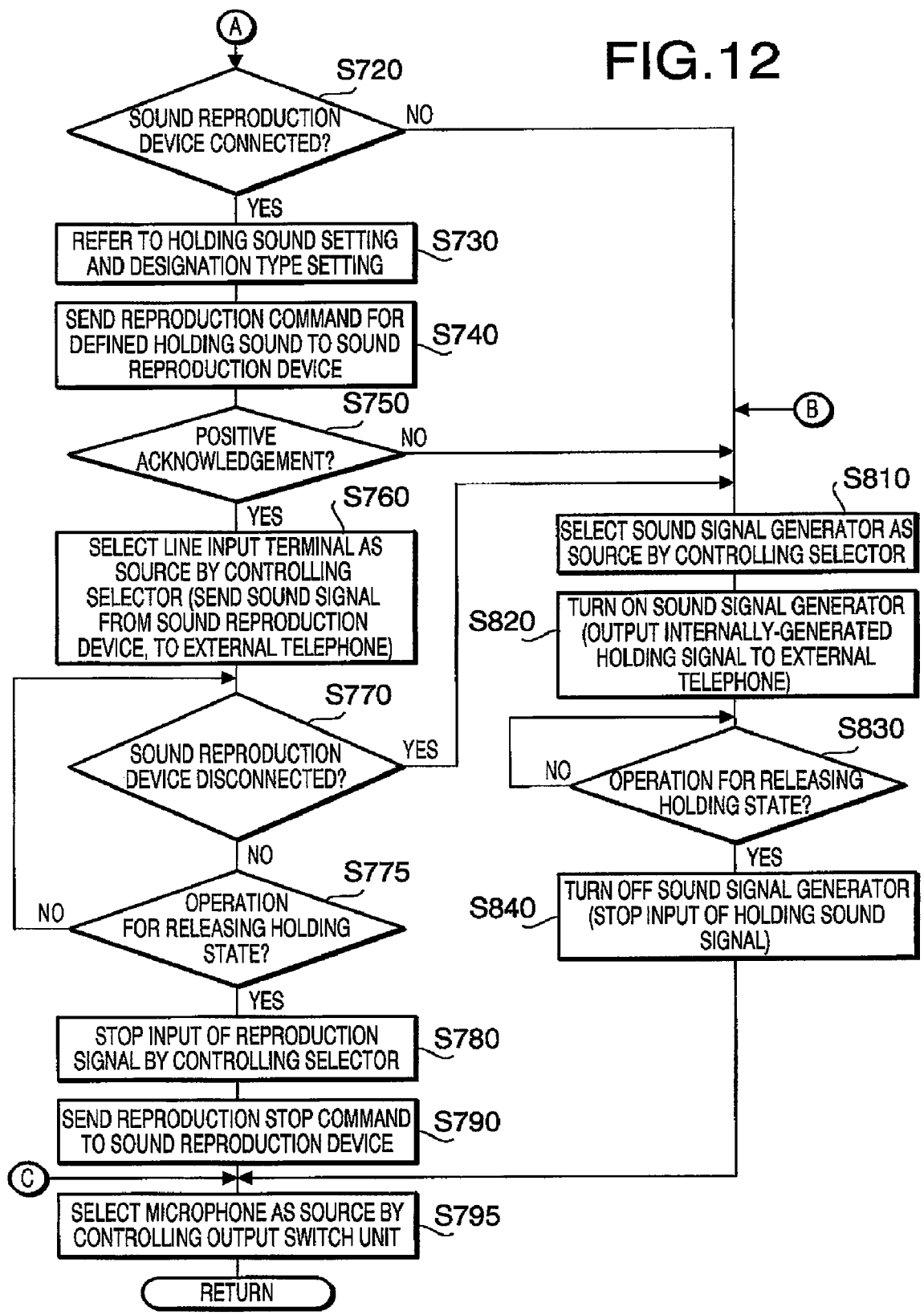

Hereafter, a holding sound output process executed repeatedly by the control unit 31 of the MFP 30 is explained. FIGS. 11 and 12 illustrate a flowchart of the holding sound output process. As described above, the holding sound output process is executed concurrently with the sound setting process, the call sound output process, the background music output process, and the alarm sound output process.

When the holding sound output process is initiated, the control unit 31 judges whether the MFP 30 is connected to an external telephone via the PSTN (i.e., whether the MFP 30 is in a connected state) (step S710). If the MFP 30 is in the connected state (S710: YES), control proceeds to step S713. The control unit 31 waits until the MFP 30 moves to the connected state (S710: NO).

In step S713, the control unit 31 judges whether a user operation for holding is conducted by the user through the user interface 41. If the user operation for holding is not conducted (S713: NO), control returns to step S710. If the user operation for holding is conducted (713: YES), control proceeds to step S717. The term "user operation for holding" means a user operation for moving the telephone unit 37 to the holding state. The term "holding state" means a state where the telephone unit 37 is held in a connected state even if the handset 37d is pulled down.

In step S717, the control unit 31 controls the output switch unit 37b to form a transmission path connecting the amplifier 37c with the network control unit 37a. Consequently, the sound signal from the sound generation unit 35 is transmitted to the PSTN via the amplifier 37c, the output switch unit 37b and the network control unit 37a. That is, an input source for an external telephone is switched from the microphone 37e to the sound generation unit 35 so that a sound signal from the sound generation unit 35 is transmitted to an external telephone.

Next, in step S719, the control unit 31 judges whether the background music reproduced by the sound reproduction device 10 is being outputted from the speaker 35e. If the background music is being outputted from the speaker 35e (S719: YES), control proceeds to step S850. If the background music is not being outputted from the speaker 35e (S719: NO), control proceeds to step S720.

In step S720, the control unit 31 judges whether the sound reproduction device 10 is connected to one of the USB connectors 47a in the same manner as that of step S220. If the sound reproduction device 10 is connected to one of the USB connectors 47a (S 720: YES), control proceeds to step S730. If the sound reproduction device 10 is not connected to one of the USB connectors 47a (S720: NO), control proceeds to step S810.

In step S730, the control unit 31 refers to the holding sound setting information and the designation type setting information stored in the NVRAM 31d, and generates the reproduction command based on such setting information. Then, the control unit 31 transmits the reproduction command to the sound reproduction device 10 via the USB interface 47 (step S740). More specifically, if the designation type corresponds to the file designation type, the control unit 31 generates the reproduction command in which a code representing the file designation type is described as the designation type, and a file name represented by the holding sound setting information is described as the title designation information. The reproduction command generated as above is transmitted to the sound reproduction device 10.

After step S740 is processed, the control unit 31 judges whether an acknowledgment is received as a response to the reproduction command in the same manner as step S450 (step S750). For example, the control unit 31 monitors the line input terminal SLin to detect the sound signal from the sound reproduction device 10. In this case, the control unit 31 judges that the acknowledgement is received if the sound signal is received from the line input terminal SLin, while the control unit 31 judges that the acknowledgement is not received if the sound signal is not received from the line input terminal SLin within a predetermined time period.

If it is judged in step S750 that an acknowledgment is received (S750: YES), control proceeds to step S760. If it is judged in step S750 that an acknowledgment is not received (S750: NO), control proceeds to step S810.

In step S760, the control unit 31 controls the selector 35c so that a transmission path connecting the line input terminal SLin to the amplifier 35d is formed. That is, in this case, the sound signal inputted through the line input terminal SLin is transmitted to the amplifier 35d.

After the transmission path is thus formed, the sound signal from the sound reproduction device 10 is inputted to the speaker 35e and sound corresponding to the sound signal is outputted from the speaker 35e. As a result, sound of the song title represented by the reproduction command is outputted from the speaker 35e as the holding sound.

After step S760 is processed, the control unit 31 waits until the sound reproduction device 10 is disconnected from the USB interface 47a or a user operation for releasing the holding state is conducted through the user interface 41 (S770: NO, S775: NO).

If the user operation for releasing the holding state is conducted (S775: YES), control proceeds to step S780 where the control unit 31 controls the selector 35c to set the selector 35c to the non-transmission mode so that the sound signal inputted from the line input terminal SLin is not transmitted to the amplifier 35d and to the telephone unit 37. After step S775 is processed, output of the holding sound from the speaker 35e and the external telephone is stopped. Additionally, in step S775, the control unit 31 may judge that the user operation for releasing the holding state is conducted if the line is disconnected.

Then, the control unit 31 transmits the reproduction stop command to the sound reproduction device 10 via the USB interface 47 (step S790). Next, in step S795, the control unit 31 controls the output switch unit 37b to form a transmission path connecting the microphone 37e with the network control unit 37a so that the voice signal of the user picked up by the microphone 37e is transmitted to the PSTN via the network control unit 37a. That is, an input source of the output switch unit 37b is changed from the sound generation unit 35 to the microphone 37e. After step S795 is finished, control exits the holding sound output process to further wait for a next user operation for holding.

In step S810, the control unit 31 controls the selector 35c to form a transmission path connecting the sound signal generator 35 with the amplifier 35d so that a sound signal from the sound signal generator 35a is transmitted to the amplifier 35d via the selector 35c. That is, an input source of the selector 35c is changed from the line input terminal SLin to the sound signal generator 35a.

After step S810 is finished, the control unit 31 enables the holding sound generation function of the sound signal generator 35a so that an internal sound signal generated by the sound signal generator 35a is transmitted to the speaker 35e and to an external telephone via the network control unit 37a. As a result, the internally-generated holding sound is outputted from the speaker 35e and is outputted from the external telephone.

Next, the control unit 31 waits until a user operation for releasing the holding state is conducted by the user through the user interface 41 (S830: NO). If the user operation for releasing the holding state is conducted (S830: YES), the control unit 31 disables the holding sound generation function of the sound signal generator 35a so that output of the internal sound signal is stopped. Then, control proceeds to step S795.

If it is judged in step S719 that the background music is being outputted from the speaker 35e (S719: YES), control proceeds to step S850 where the control unit 31 waits until the sound reproduction device 10 is disconnected from the USB interface 47 or the user operation for releasing the holding state is conducted (S850:NO, S860:NO). If the sound reproduction device 10 is disconnected from the USB interface 47 (S850: YES), control proceeds to step S810.

If the user operation for releasing the holding state is conducted (S860: YES), control proceeds to step S795 where the control unit 31 controls the output switch unit 37b to change an input source of the output switch unit 37b to the microphone 37e. In this case, a sound signal from the microphone 37e is transmitted to an external telephone. Additionally, the control unit 31 judges that the user operation for releasing the holding state is conducted if the line is disconnected. After step S795 is processed, control exits the holding sound output process to further wait for a next user operation for holding.

Figure 13:
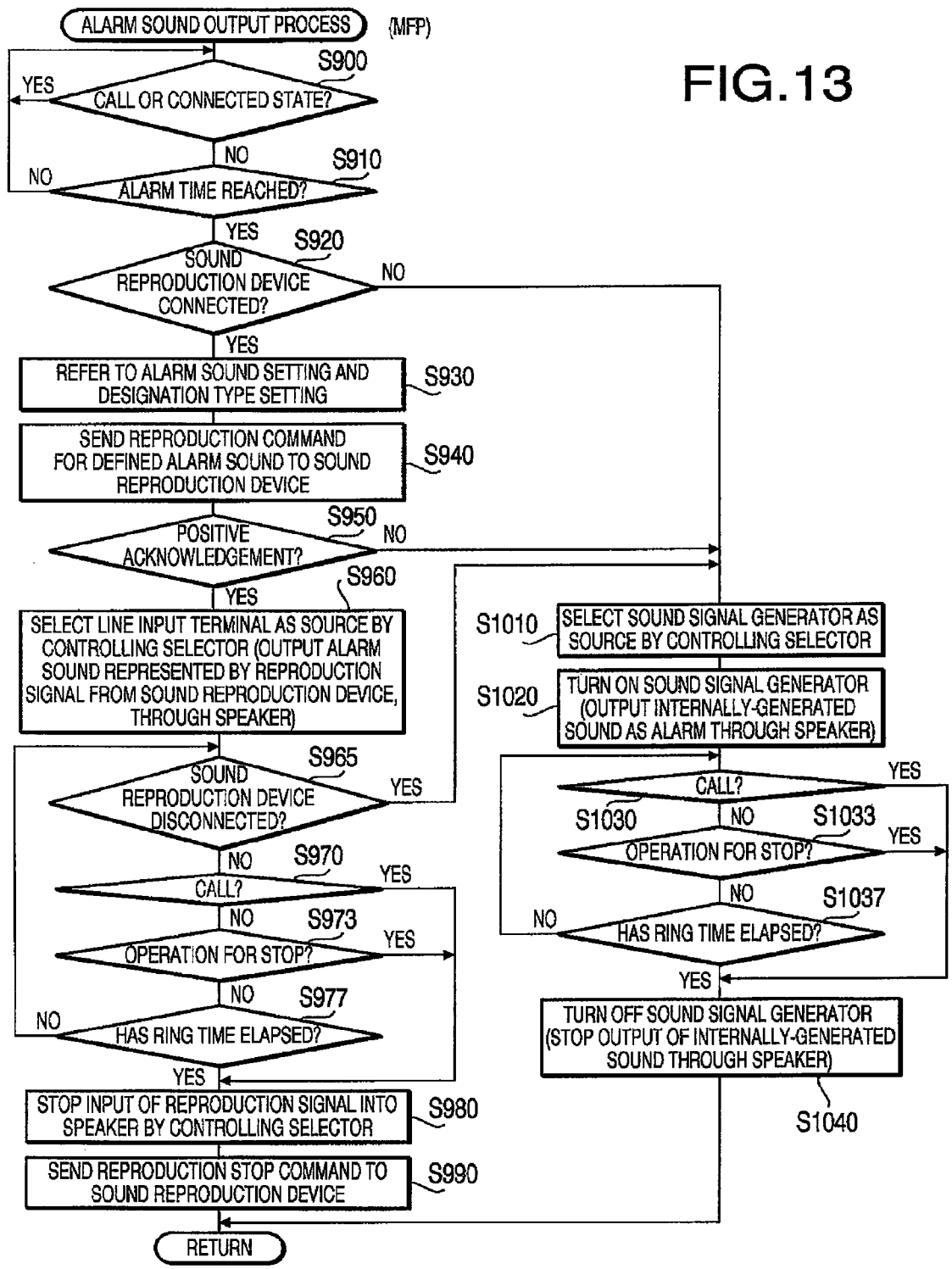
FIG. 13 is a flowchart illustrating an alarm sound output process executed by the MFP.

Hereafter, an alarm sound output process executed repeatedly by the control unit 31 of the MFP 30 is explained. FIG. 13 is a flowchart illustrating the alarm sound output process. As described above, the alarm sound output process is executed concurrently with the sound setting process, the call sound output process, the background music output process, and the holding sound output process.

When the alarm sound output process is initiated, the control unit 31 waits until the network control unit 37a receives a call from an external telephone or an external facsimile device through the PSTN or the network control unit 37a is connected to an external telephone or a facsimile device (step S900: NO). If a call is received or the network control unit 37a is moved to the connected state, the control unit 31 waits until the network control unit 37a is moved to a state where a call is not received or to a state where the network control unit 37a is in the disconnected state. The S900 is executed to output preferentially the call sound, the background music or the holding sound with respect to the alarm sound.

If the network control unit 37a is not in the state of receiving a call and in the connected state (S900: NO), the control unit 31 judges whether an alarm time which has been set by the user in advance is reached (step S910). If the alarm time is not reached (S910: NO), control returns to step S900. If the alarm time is reached (S910: YES), control proceeds to step S920.

In step S920, the control unit 31 judges whether the sound reproduction device 10 is connected to one of the USB connectors 47a in the same manner as that of step S420. If the sound reproduction device 10 is connected to one of the USB connectors 47a (S920: YES), control proceeds to step S930 where the control unit 31 refers to the alarm sound setting information and the designation type setting information stored in the NVRAM 31d, and generates the reproduction command based on such setting information in the NVRAM 31d. Then, the control unit 31 transmits the reproduction command to the sound reproduction device 10 via the USB interface 47 (step S940). More specifically, if the designation type corresponds to the file designation type, the control unit 31 generates the reproduction command in which a code representing the file designation type is described as the designation type, and a file name represented by the alarm sound setting information is described as the title designation information. The reproduction command generated as above is transmitted to the sound reproduction device 10.

After step S940 is processed, the control unit 31 judges whether an acknowledgement is received as a response to the reproduction command (step S950). For example, the control unit 31 monitors the line input terminal SLin to detect the sound signal from the sound reproduction device 10. In this case, the control unit 31 judges that the acknowledgement is received if the sound signal is received from the line input terminal SLin, while the control unit 31 judges that the acknowledgement is not received if the sound signal is not received from the line input terminal SLin within a predetermined time period.

If it is judged in step S950 that an acknowledgment is received as a response to the reproduction command (S950: YES), control proceeds to step S960 where the control unit 31 controls the selector 35c so that a transmission path connecting the line input terminal SLin to the amplifier 35d is formed. That is, in this case, the sound signal inputted through the line input terminal SLin is transmitted to the amplifier 35d.

After the transmission path is thus formed, the sound signal from the sound reproduction device 10 is inputted to the speaker 35e and sound corresponding to the sound signal is outputted from the speaker 35e. As a result, sound of the song title represented by the reproduction command is outputted from the speaker 35e as alarm sound.

After step S960 is processed, the control unit 31 waits until the sound reproduction device 10 is disconnected from the USB interface 47, a call is received from the PSTN, a user operation for stopping output of an alarm sound is conducted through the user interface 41, or a predetermined ringing time period has elapsed (S965: NO, S970: NO, S973: NO, S977: NO). If the sound reproduction device 10 is disconnected from the USB interface 47 (S965: YES), control proceeds to step S1010.

If a call is received form the PSTN, a user operation for stopping output of the alarm sound is conducted through the user interface 41, or a predetermined ringing time period has elapsed (S970: YES, S973: YES, or S977: YES), control proceeds to step S980 where the control unit 31 controls the selector 35c to set the selector 35c to the non-transmission mode so that the sound signal inputted from the line input terminal SLin is not transmitted to the amplifier 35d. Consequently, the output of the alarm sound from the speaker 35e is stopped.

After step S980 is processed, the control unit 31 sends a reproduction stop command to the sound reproduction device 10 via the USB interface 47. Then, control exits the alarm sound output process.

If it is judged in step S920 that the sound reproduction device 10 is not connected to the USB connectors 47a (S920: NO), control proceeds to step S1010 where the control unit 31 controls the selector 35c to form a transmission path connecting the sound signal generator 35a to the amplifier 35d so that a sound signal from the sound signal generator 35a is transmitted to the amplifier 35d. That is, the selector 35c defines an input terminal connected to the sound signal generator 35a as an input source.

Next, in step S1020, the control unit 31 controls the sound signal generator 35a to enable the alarm sound generation function of the sound signal generator 35a so that an internal sound signal (a alarm sound signal) generated by the sound signal generator 35a is inputted to the speaker 35e. As a result, internally-generated sound is outputted from the speaker 35e as alarm sound.

After step S1020 is processed, the control unit 31 waits until a call is received form the PSTN, a user operation for stopping output of alarm sound is conducted through the user interface 41, or a predetermined ringing time period has elapsed (S1030: NO, S1033: NO, S1037: NO). If a call is received from the PSTN, a user operation for stopping output of the alarm sound is conducted through the user interface 41, or a predetermined ringing time period has elapsed (S1030: YES, S1033: YES, or S1037: YES), control proceeds to step S1040 where the control unit 31 controls the sound signal generator 35a to disable the alarm sound generation function and to stop the output of the internally-generated sound. Then, control exits the call sound output process to further wait a call.

As described above, in the sound output system 1, when a call is received from the PSTN, the MFP 30 is changed to the voice communication mode, or the alarm time is reached, the MFP 30 transmits the reproduction command to the sound reproduction device 10 connected to the USB interface 47 so that a sound signal outputted from the line out terminal SLout of the sound reproduction device 10 is received. Then, the sound signal is inputted to the speaker 35e so that sound such as call sound, background music or alarm sound is outputted from the speaker 35e.

In the sound output system 1, when the MFP 30 moves to the holding state, the MFP 30 transmits the reproduction command to the sound reproduction device 10 connected to the USB interface 47 so that a sound signal outputted from the line out terminal SLout of the sound reproduction device 10 is inputted to the line input terminal SLin. In this case, input source of the selector 37b is changed to the sound generation unit 35, and the sound signal from the sound reproduction device 10 is outputted to the PSTN. Consequently, the sound signal from the sound reproduction device 10 is outputted from an external telephone as holding sound.

In regard to sound data which the sound reproduction device 10 is able to reproduce, the MFP 30 does not need to have the reproduction function for the sound data. Even if the reproduction function for the sound data is not provided in the MFP 30, the MFP 30 is able to output sound corresponding to the sound data as call sound, background music or alarm sound. The MFP 30 is able to output sound corresponding to the sound data through an external telephone, as holding sound.

Therefore, according to the sound output system 1, it is possible to easily define the sound corresponding to the sound data, that the sound reproduction device 10 has, as call sound, background music, holding sound or alarm sound. In addition, since the sound data is reproduced through the reproduction function of the sound reproduction device 10, it is possible to output sound such as call sound, background music, holding sound or alarm sound from the MFP 30 based on various types of sound data formats.

According to the sound output system 1, the sound signal corresponding to the sound data which has been subjected to the reproduction process of the sound reproduction device 10 is inputted to the MFP 30, and the call sound is outputted from the MFP 30. Therefore, it is possible to output call sound without causing the user to have uncomfortable feeling in comparison with a conventional sound output system in which call sound is outputted from a device different from a telephone.

Therefore, according to the embodiment, it is possible to provide a device (e.g., a MFP, a telephone, and an alarm clock) capable of suitably outputting sound corresponding to an event while achieving a high degree of freedom of choice in regard to sound data to be reproduced.

In the above mentioned embodiment, the sound reproduction device 10 is connected to the MFP through the USB interface, and the sound signal outputted from the line out terminal of the sound reproduction device 10 is inputted to the MFP 30. Therefore, the configuration of the sound output system 1 according to the embodiment can be achieved by utilizing an existing sound reproduction device having an USB interface and a line out terminal for an ear phone.

As shown in FIG. 6, the line out terminal SLout of the sound reproduction device 10 is not directly connected to the speaker 35e, but is connected to the speaker 35e in such a manner that only when an event occurs, the line out terminal SLout is connected to the speaker 35e, by locating the selector 35c on the transmission path between the line input terminal SLin and the speaker 35e. Therefore, according to the embodiment, it is possible to suitably output call sound, background music, holding sound and alarm sound while utilizing the reproduction function of the sound reproduction device 10.

In the above mentioned embodiment, the USB connector 47a and the line input terminal SLin of the MFP 30 function as an interface for interfacing the MFP 30 with the sound reproduction device 10. That is, the USB connector 47a functions as an interface for transmission of a command signal, and the line input terminal SLin functions as an interface for receiving a sound signal. The USB connector 19a and the line output terminal SLout of the sound reproduction device function as an interface for interfacing the sound reproduction device 10 with the MFP 30.

Each of steps S440, S640, S740 and S940 corresponds to a functional unit (a command output unit) for outputting a reproduction command. The sequence of steps S460 to S540 (S660 to S690, S717, S760 to S840, or S960 to S1040) corresponds to a functional unit (an output control unit) for controlling sound output. Step S130 corresponds to a functional unit (a reproduction signal output unit) for outputting a sound signal (i.e., a reproduced signal).

Although the present invention has been described in considerable detail with reference to certain preferred embodiments thereof, other embodiments are possible.

For example, although in the above mentioned embodiment a USB interface is used to transmit a command signal, various types of interfaces such as an IEEE 1394 interface may be used to transmit a command signal.

For example, if the MFP 30 has the function of receiving and transmitting e-mails, it is possible to configure the MFP 30 such that the MFP 30 outputs call sound upon receiving an e-mail.

The MFP 30 may be configured to have a network interface enabling the MFP 30 to communicate with nodes on a network. In this case, the MFP 30 may be configured to receive time information from an external device through the network and to adjust an internal timer in accordance with the received time information. The MFP 30 may be configured to provide time information of the internal time so that the sound reproduction device 10 can adjust an internal timer of the sound reproduction device 10.

If the sound reproduction device 10 has a reproduction function of reproducing moving image data stored in the storage unit 13 upon receipt of the reproduction command from the MFP 30, and the MFP 30 has a video signal input terminal, it is possible to display a moving image (corresponding to a video signal from the sound reproduction device 10) on the user interface 41 of the MFP 30 when a predetermined event (e.g., receipt of an incoming call) occurs. In this case, the MFP 30 does not need to have a function of reproducing moving image data because the MFP 30 is able to utilize the function of reproducing moving image data provided in the sound reproduction device 10.

What is claimed is:

1. An output system comprising:
   an information reproduction device; and
   an electronic device, the electronic device including:
   a speaker;
   a first connection interface through which a command signal is transmitted to the information reproduction device and a reproduced signal generated by the information reproduction device is inputted to the electronic device;
   a command output unit configured to transmit the command signal for instructing the information reproduction device to execute a reproduction process through the first connection interface in response to occurrence of a predetermined event;
   an output control unit configured to output reproduced information which is reproduced by the information reproduction device and corresponds to the reproduced signal received through the first connection interface from the information reproduction device in response to transmission of the command signal;
   a selection unit configured to select a song title to be reproduced in response to occurrence of a predetermined event from a plurality of song titles obtained from the information reproduction device;
   a memory in which the selected song title is stored; and
   an internal signal generation unit configured to generate an internal sound signal to be outputted in response to occurrence of the predetermined event,
   wherein the information reproduction device comprises:

a second connection interface configured to interface the information reproduction device with the first connection interface of the electronic device;
a storage unit storing information to be subjected to the reproduction process;
a reproduction unit configured to execute the reproduction process for the information stored in the storage unit; and
a reproduction signal output unit configured to cause the reproduction unit to execute the reproduction process and to transmit the reproduced signal corresponding to the reproduced information generated by the reproduction unit, in response to receipt of the command signal through the second connection interface,
wherein command output unit transmits the command signal instructing the information reproduction device to execute the reproduction process for reproducing the selected song title,
wherein the output control unit outputs, through the speaker of the electronic device, a sound signal when the sound signal corresponding to the selected song title is received from the information reproduction device, and outputs the internal sound signal generated by the internal signal generation unit through the speaker when the sound signal corresponding to the selected song title is not received from the information reproduction device.

2. The output system according to claim 1, wherein:
the first connection interface includes a first interface through which the command signal is transmitted and a second interface through which the reproduced signal is inputted;
the command output unit transmits the command signal through the first interface; and
the output control unit outputs the reproduced information through the second interface.

3. The output system according to claim 2,
wherein the electronic device further comprises:
a first judging unit configured to judge whether the information reproduction device is connected to the electronic device through the first interface; and
a second judging unit configured to judge whether the information reproduction device is connected to the electronic device through the second interface,
wherein only if both of the first judging unit and the second judging unit judge that the information reproduction device is connected to the electronic device, the command output unit operates to transmit the command signal and the output control unit operates to output the reproduced information.

4. The output system according to claim 1, wherein:
the information stored in the storage unit of the information reproduction device includes sound data;
the reproduction unit executes the reproduction process for reproducing the sound data stored in the storage unit; and
the reproduced signal transmitted by the reproduction signal output unit corresponds to the reproduced sound data generated by the reproduction unit.

5. The output system according to claim 4, wherein:
the output control unit of the electronic device inputs the reproduced signal to the speaker so that sound represented by the reproduced signal is outputted through the speaker.

6. The output system according to claim 4, wherein:
the electronic device has a telephone function;
the command output unit transmits the command signal to the information reproduction device in response to occurrence of the predetermined event in a state where the electronic device is connected to an external telephone via a public switched telephone network; and
the output control unit transmits the reproduced signal to the external telephone via the public switched telephone network so that sound represented by the reproduced signal is outputted on the external telephone.

7. The output system according to claim 5, wherein:
the electronic device further comprises:
a song list request unit configured to transmit a request for a song list to the information reproduction device,
the information reproduction device further comprises:
a song list providing unit configured to transmit the song list listing song titles stored in the storage unit as the sound data, in response to receipt of the request from the electronic device.

8. The output system according to claim 5, wherein:
the command signal transmitted by the command output unit of the electronic device includes a code instructing execution of the reproduction process and a code designating a title to be reproduced; and
the reproduction unit executes the reproduction process for reproducing the sound data corresponding to the title designated by the command signal.

9. An electronic device for use with an information reproduction device, comprising:
a speaker;
a connection interface through which a command signal is transmitted to the information reproduction device and a reproduced signal generated by the information reproduction device is inputted to the electronic device;
a command output unit configured to transmit the command signal for instructing the information reproduction device to execute a reproduction process through the connection interface in response to occurrence of a predetermined event;
an output control unit configured to output reproduced information which is reproduced by the information reproduction device and corresponds to the reproduced signal received through the connection interface from the information reproduction device in response to transmission of the command signal;
a selection unit configured to select a song title to be reproduced in response to occurrence of a predetermined event from a plurality of song titles obtained from the information reproduction device;
a memory in which the selected song title is stored; and
an internal signal generation unit configured to generate an internal sound signal to be outputted in response to occurrence of the predetermined event,
wherein the command output unit transmits the command signal instructing the information reproduction device to execute the reproduction process for reproducing the selected song title,
wherein the output control unit outputs, through the speaker of the electronic device, a sound signal when the sound signal corresponding to the selected song title is received from the information reproduction device, and outputs the internal sound signal generated by the internal signal generation unit through the speaker when the sound signal corresponding to the selected song title is not received from the information reproduction device.

10. The electronic device according to claim 9, wherein:
the connection interface includes a first interface through which the command signal is transmitted and a second interface through which the reproduced signal is inputted;

the command output unit transmits the command signal through the first interface; and the output control unit outputs the reproduced information through the second interface.

11. The electronic device according to claim 10, further comprising:
a first judging unit configured to judge whether the information reproduction device is connected to the electronic device through the first interface; and
a second judging unit configured to judge whether the information reproduction device is connected to the electronic device through the second interface,
wherein only if both of the first judging unit and the second judging unit judge that the information reproduction device is connected to the electronic device, the command output unit operates to transmit the command signal and the output control unit operates to output the reproduced information.

12. The electronic device according to claim 9, wherein the reproduced signal inputted through the connection interface corresponds to reproduced sound data generated by the information reproduction device.

13. The electronic device according to claim 12,
wherein the output control unit inputs the reproduced signal to the speaker so that sound represented by the reproduced signal is outputted through the speaker.

14. The electronic device according to claim 12, wherein:
the electronic device has a telephone function;
the command output unit transmits the command signal to the information reproduction device in response to occurrence of the predetermined event in a state where the electronic device is connected to an external telephone via a public switched telephone network; and
the output control unit transmits the reproduced signal to the external telephone via the public switched telephone network so that sound represented by the reproduced signal is outputted on the external telephone.

15. The electronic device according to claim 13, further comprising a communication interface that interfaces the electronic device with a communication line,
wherein:
the command output unit transmits the command signal for instructing the information reproduction device to reproduce sound data, in response to receipt of an incoming call from the communication line; and
the output control unit inputs the reproduced signal to the speaker so that sound represented by the reproduced signal is outputted through the speaker as call sound.

16. The electronic device according to claim 13, wherein:
the electronic device has a telephone function;
the command output unit transmits the command signal for instructing the information reproduction device to reproduce sound data, in response to a fact that the electronic device moves to a voice communication state; and
the output control unit inputs the reproduced signal to the speaker so that sound represented by the reproduced signal is outputted through the speaker as background music for voice communication.

17. The electronic device according to claim 13, wherein:
the electronic device has a function as an alarm clock;
the command output unit transmits the command signal for instructing the information reproduction device to reproduce sound data when a predetermined alarm time is reached; and the output control unit inputs the reproduced signal to the speaker so that sound represented by the reproduced signal is outputted through the speaker as alarm sound.

18. The electronic device according to claim 13, wherein:
the connection interface has a first interface through which the command signal is transmitted and a second interface through which the reproduced signal is inputted to the electronic device;
the second interface is a line input terminal to which a sound signal corresponding to the reproduced signal is inputted from the information reproduction device;
the output control unit includes a transmission path formation unit capable of forming a transmission path to the speaker; and
the output control unit controls the transmission path formation unit to form a transmission path from the line input terminal to the speaker when the sound represented by the reproduced signal is outputted through the speaker.

19. The electronic device according to claim 13,
further comprising:
a judgment unit configured to judge whether the information reproduction device is connected to the connection interface,
wherein the output control unit causes the internal signal generation unit to generate the sound signal and inputs the sound signal generated by the internal signal generation unit to the speaker so that sound corresponding to the sound signal generated by the internal signal generation unit is outputted through the speaker in place of the sound corresponding to the reproduced signal, if the judgment unit judges that the information reproduction device is not connected to the connection interface.

20. The electronic device according to claim 18,
further comprising:
a first judgment unit configured to judge whether the information reproduction device is connected to the first interface; and
a second judgment unit configured to judge whether the information reproduction device is connected to the second interface,
wherein the output control unit causes the internal signal generation unit to generate the sound signal and inputs the sound signal generated by the internal signal generation unit to the speaker so that sound corresponding to the sound signal generated by the internal signal generation unit is outputted through the speaker in place of the sound corresponding to the reproduced signal, if the first judgment unit judges that the information reproduction device is not connected to the first interface or if the second judgment unit judges that the information reproduction device is not connected to the second interface.

21. The electronic device according to claim 14, wherein:
the telephone function includes a function of accepting an operation for holding;
the command output unit transmits the command signal for instructing the information reproduction device to reproduce sound data, in response to acceptance of the operation for holding; and
the output control unit transmits the reproduced signal to the external telephone via the public switched telephone network so that the sound represented by the reproduced signal is outputted on the external telephone as holding sound.

* * * * *